US00RE39116E

(19) United States
(12) Reissued Patent
Shirani et al.

(10) Patent Number: US RE39,116 E
(45) Date of Reissued Patent: Jun. 6, 2006

(54) NETWORK LINK DETECTION AND GENERATION

(75) Inventors: Ramin Shirani, Morgan Hill, CA (US); Brian C. Edem, Saratoga, CA (US)

(73) Assignee: Negotiated Data Solutions LLC, Chicago, IL (US)

(21) Appl. No.: 09/286,679

(22) Filed: Apr. 1, 1999

Related U.S. Patent Documents

Reissue of:
(64) Patent No.: 5,617,418
Issued: Apr. 1, 1997
Appl. No.: 08/146,729
Filed: Nov. 1, 1993

U.S. Applications:
(

(63) Continuation-in-part of application No. 07/971,018, filed on Nov. 2, 1992, now abandoned.

(51) Int. Cl.
*H04Q 1/30* (2006.01)

(52) U.S. Cl. ..... 370/465; 370/410; 370/402

(58) Field of Classification Search ..... 340/425.5, 340/825.51, 825.54, 825.06, 825.07; 370/389, 370/465, 466, 276, 496, 486, 468, 400, 410, 370/252, 254, 256, 255, 258, 401–409, 424, 370/467, 469, 906, 907, 908, 904, 902; 375/222, 375/221, 224, 225, 377; 359/135, 136, 124, 359/128

See application file for complete search history.

(56) References Cited

U.S. PATENT DOCUMENTS 3,619,505 A 11/1971 Melle ..... 375/110
3,835,260 A 9/1974 Prescher et al. ..... 379/237
3,988,716 A 10/1976 Fletcher et al. ..... 370/100.1
4,063,220 A 12/1977 Metcalfe et al. ..... 340/147
4,099,024 A 7/1978 Boggs ..... 178/71

(Continued)

FOREIGN PATENT DOCUMENTS

DE A4 221474 10/1992
DE A-4221 474 A1 10/1992

(Continued)

OTHER PUBLICATIONS

D. Wong, 'Second Generation 10BASE T Silicon Solutions', IRE Wescon Convention Record, vol. 35, Nov. 1991, North Hollywood US, pp. 238–242.*

(Continued)

*Primary Examiner*—Dang Ton
(74) *Attorney, Agent, or Firm*—Loudermilk & Associates

(57) ABSTRACT

Support for a mixed network environment is provided which can contain multiple isochronous and/or non-isochronous LAN protocols such as Isochronous-Ethernet. Ethernet, isochronous-token ring, token ring, other isochronous-LAN or other LAN Systems. Support for a mixed environment includes a protocol detection mechanism which is embodied in a handshaking scheme. This handshaking scheme determines the signalling capability at the end points of the link and implements the correct protocol. This enables isochronous nodes and hubs to automatically detect the presence of Ethernet, token ring, or other LAN equipment at the other and of the network cable. If this detection occurs, the isochronous LAN equipment will fall-back to a LAN compliant mode of operation. Typically, only the hub will have the capability of operating at different networking modes, such as Ethernet, Token Ring isochronous modes. The hub will listen for some form of identification from the attached nodes as to the type of service to provide—isochronous or non-isochronous: Ethernet, token ring or other LAN service.

52 Claims, 15 Drawing Sheets

U.S. PATENT DOCUMENTS

| | | | | | |
|---|---|---|---|---|---|
| 4,150,404 | A | | 4/1979 | Tercic et al. | 380/22 |
| 4,220,816 | A | * | 9/1980 | Howells et al. | 370/24 |
| 4,258,434 | A | * | 3/1981 | Glowinski et al. | 370/60 |
| 4,347,527 | A | | 8/1982 | Lainez | 358/310 |
| 4,359,770 | A | | 11/1982 | Suzuka | 370/105.3 |
| 4,412,324 | A | * | 10/1983 | Glowinsky et al. | 370/58.1 |
| 4,419,765 | A | | 12/1983 | Wycoff et al. | 455/38.3 |
| 4,429,405 | A | | 1/1984 | Bux et al. | 375/89 |
| 4,445,213 | A | | 4/1984 | Baugh et al. | 370/94.1 |
| 4,449,248 | A | | 5/1984 | Leslie et al. | 455/38.3 |
| 4,472,802 | A | | 9/1984 | Pin et al. | 370/108 |
| 4,484,218 | A | | 11/1984 | Boland et al. | 358/86 |
| 4,530,088 | A | * | 7/1985 | Hamstra et al. | 370/110.1 |
| 4,543,652 | A | | 9/1985 | Amada et al. | 370/66 |
| 4,547,880 | A | | 10/1985 | De Vita et al. | 370/67 |
| 4,549,292 | A | * | 10/1985 | Isaman et al. | 370/85.7 |
| 4,556,970 | A | | 12/1985 | Flanagin et al. | 370/60 |
| 4,577,312 | A | | 3/1986 | Nash | 370/84 |
| 4,577,315 | A | | 3/1986 | Otsuka | 455/38.3 |
| 4,580,276 | A | * | 4/1986 | Andruzzi et al. | 375/269 |
| 4,587,650 | A | * | 5/1986 | Bell | 370/85.7 |
| 4,637,014 | A | * | 1/1987 | Bell et al. | 370/85.7 |
| 4,656,592 | A | | 4/1987 | Spaanenburg et al. | 364/490 |
| 4,661,902 | A | | 4/1987 | Hochsprung | 364/200 |
| 4,674,082 | A | | 6/1987 | Flanagin et al. | 370/60 |
| 4,677,611 | A | * | 6/1987 | Yanosy, Jr. et al. | 370/85.2 |
| 4,689,786 | A | | 8/1987 | Sidhu | 370/94 |
| 4,700,349 | A | | 10/1987 | Gallager | 371/30 |
| 4,713,817 | A | | 12/1987 | Wei | 371/43 |
| 4,715,002 | A | | 12/1987 | Vernon et al. | 364/422 |
| 4,726,018 | A | | 2/1988 | Bux et al. | 370/85.5 |
| 4,759,010 | A | | 7/1988 | Murata et al. | 370/66 |
| 4,766,590 | A | * | 8/1988 | Hamada et al. | 370/85.15 |
| 4,766,591 | A | | 8/1988 | Huang | 370/60 |
| 4,769,813 | A | | 9/1988 | Lenart | 370/60 |
| 4,771,417 | A | * | 9/1988 | Maxwell et al. | 370/296 |
| 4,771,426 | A | | 9/1988 | Rattlingourd et al. | 375/120 |
| 4,782,485 | A | | 11/1988 | Gollub | 370/118 |
| 4,800,560 | A | | 1/1989 | Aoki et al. | 370/108 |
| 4,807,224 | A | | 2/1989 | Naron et al. | 370/94.1 |
| 4,811,367 | A | | 3/1989 | Tajika | 370/108 |
| 4,825,435 | A | * | 4/1989 | Amundsen et al. | 370/85.1 |
| 4,837,799 | A | | 6/1989 | Prohs et al. | 379/224 |
| 4,845,609 | A | * | 7/1989 | Lighthart et al. | 370/85.14 |
| 4,847,613 | A | | 7/1989 | Sakurai et al. | 340/825.21 |
| 4,858,232 | A | | 8/1989 | Diaz et al. | 370/85.7 |
| 4,866,704 | A | | 9/1989 | Bergman | 370/85.4 |
| 4,872,157 | A | | 10/1989 | Hemmady et al. | 370/60 |
| 4,876,683 | A | | 10/1989 | Suzuki | 370/97 |
| 4,882,728 | A | | 11/1989 | Herman | 370/85 |
| 4,884,266 | A | | 11/1989 | Pflaumer | 370/84 |
| 4,897,831 | A | * | 1/1990 | Negi et al. | 370/296 |
| 4,907,260 | A | | 3/1990 | Prohs et al. | 379/224 |
| 4,910,794 | A | | 3/1990 | Mahany | 455/67 |
| 4,920,483 | A | | 4/1990 | Pogue et al. | 395/425 |
| 4,930,127 | A | | 5/1990 | Abaziou et al. | 370/110.4 |
| 4,931,250 | A | | 6/1990 | Greszczuk | 375/8 |
| 4,954,988 | A | | 9/1990 | Robb | 365/189.02 |
| 4,959,774 | A | | 9/1990 | Davis | 364/200 |
| 4,961,188 | A | * | 10/1990 | Lau | 370/94.2 |
| 4,964,121 | A | | 10/1990 | Moore | 370/100.1 |
| 4,975,830 | A | | 12/1990 | Gerpheide | 364/200 |
| 4,977,582 | A | | 12/1990 | Nichols et al. | 375/118 |
| 4,985,891 | A | | 1/1991 | Fujiwara et al. | 370/110.1 |
| 4,993,026 | A | | 2/1991 | Yamashita | 370/100.1 |
| 5,001,707 | A | * | 3/1991 | Kositpaiboon et al. | 370/85.1 |
| 5,007,045 | A | | 4/1991 | Tsuzuki | 370/94.1 |
| 5,014,247 | A | | 5/1991 | Albachten, III et al. | 365/230.05 |
| 5,018,136 | A | | 5/1991 | Gollub | 370/60.1 |
| 5,020,058 | A | | 5/1991 | Holden et al. | 370/109 |
| 5,020,132 | A | | 5/1991 | Nazarenko et al. | 455/17 |
| 5,041,924 | A | | 8/1991 | Blackborow et al. | 360/69 |
| 5,058,110 | A | * | 10/1991 | Beach et al. | 370/85.6 |
| 5,065,398 | A | | 11/1991 | Takashima | 370/94.1 |
| 5,067,149 | A | | 11/1991 | Schneid et al. | 379/224 |
| 5,070,536 | A | | 12/1991 | Mahany | 455/67 |
| 5,084,872 | A | | 1/1992 | Le Cucq et al. | 370/85.1 |
| 5,095,494 | A | * | 3/1992 | Takahashi et al. | |
| 5,103,446 | A | | 4/1992 | Fischer | 370/85.1 |
| 5,119,373 | A | | 6/1992 | Fredricsson et al. | 370/85.15 |
| 5,121,382 | A | * | 6/1992 | Yang et al. | 370/296 |
| 5,128,930 | A | | 7/1992 | Nazarenko et al. | 370/60 |
| 5,134,611 | A | * | 7/1992 | Steinka et al. | 370/79 |
| 5,138,440 | A | | 8/1992 | Radice | 370/110.1 |
| 5,140,587 | A | | 8/1992 | Mueller et al. | 370/85.15 |
| 5,142,528 | A | | 8/1992 | Kobayashi | 370/79 |
| 5,146,455 | A | | 9/1992 | Goke et al. | 370/66 |
| 5,163,148 | A | | 11/1992 | Walls | 395/600 |
| 5,164,938 | A | | 11/1992 | Jurkevich et al. | 370/60 |
| 5,179,554 | A | * | 1/1993 | Lomicka et al. | 370/85.13 |
| 5,189,414 | A | | 2/1993 | Tawara | 340/825.5 |
| 5,197,061 | A | | 3/1993 | Halbert-Lassalle | 370/11 |
| 5,200,952 | A | | 4/1993 | Bernstein et al. | 370/79 |
| 5,202,899 | A | * | 4/1993 | Walsh | |
| 5,206,863 | A | | 4/1993 | Nazarenko et al. | 371/37.1 |
| 5,208,807 | A | | 5/1993 | Gass et al. | 370/60.1 |
| 5,212,724 | A | | 5/1993 | Nazarenko et al. | 371/37.1 |
| 5,214,648 | A | | 5/1993 | Lespagnol et al. | 370/85.15 |
| 5,229,998 | A | | 7/1993 | Weisser | 370/108 |
| 5,231,634 | A | | 7/1993 | Giles | 370/95 |
| 5,251,207 | A | | 10/1993 | Abensour et al. | 370/60.1 |
| 5,276,680 | A | | 1/1994 | Messenger | 370/85 |
| 5,280,500 | A | | 1/1994 | Mazzola | 375/17 |
| 5,283,786 | A | | 2/1994 | Hoff et al. | 379/85.13 |
| 5,305,306 | A | * | 4/1994 | Spinney et al. | 370/296 |
| 5,305,317 | A | | 4/1994 | Szczepanek | 370/85.5 |
| 5,311,114 | A | * | 5/1994 | Sambamurthy et al. | 370/85.3 |
| 5,315,588 | A | | 5/1994 | Kajiwara et al. | 370/60.1 |
| 5,361,261 | A | | 11/1994 | Edem et al. | 370/85.3 |
| 5,375,121 | A | | 12/1994 | Nishino et al. | 370/94.2 |
| 5,410,535 | A | | 4/1995 | Yang et al. | 370/13 |
| 5,422,887 | A | | 6/1995 | Diepstraten | 370/85.3 |
| 5,487,069 | A | | 1/1996 | O'Sullivan | 370/94.3 |
| 5,491,720 | A | | 2/1996 | Davis | 375/222 |
| 5,504,738 | A | * | 4/1996 | Sambamurthy et al. | 370/296 |
| 5,533,018 | A | | 7/1996 | DeJager et al. | 370/60.1 |
| 5,594,734 | A | | 1/1997 | Worsley et al. | 370/395 |
| 5,648,956 | A | * | 7/1997 | Sambamurthy et al. | 370/296 |
| 5,751,724 | A | | 5/1998 | Elliott | 370/536 |
| 5,761,292 | A | | 6/1998 | Wagner et al. | 379/93.09 |
| 5,790,786 | A | | 8/1998 | Wakeman et al. | 709/249 |
| 5,946,307 | A | | 8/1999 | Ohkuwa | 370/389 |
| 6,108,405 | A | | 8/2000 | Luong | 379/93.09 |

FOREIGN PATENT DOCUMENTS

| | | | |
|---|---|---|---|
| DE | 4221474 A1 | * | 10/1992 |
| EP | 0131662 | | 1/1985 |
| EP | 0318332 | | 5/1989 |
| JP | A1 254035 | | 10/1989 |
| JP | A1 297926 | | 12/1989 |
| JP | A5 175977 | | 7/1993 |
| WO | WO A 8805233 | | 7/1988 |
| WO | WO-A-89-11183 | * | 11/1989 |
| WO | WO-A-89 11183 | | 11/1989 |
| WO | WO A 8911183 | | 11/1989 |

OTHER PUBLICATIONS

C. A. Gallagher 'IEEE 802.9: A Multi–Service Lan Interface', Second IEEE National Conference on Telecommunications, Apr. 1989, York GB pp. 173–178.*

Integrated PBX Systems, An NCC State of the Art Report, The National Computing Centre Limited, 1987.*

ISDN Basic Rate Interface System Design Guide, Telenetworks document, Aug., 1989.*

ISDN Primary Rate Interface System Design Guide, Telenetworks, document, Jul., 1989.*

IEEE 802.3 Draft Supplement to IEEE Std 802.3 CSMA/CD Access Method and Physical Layer Specifications, Institute of Electrical and Electronics, Nov., 1989.*

A communication system proposal presented to representatives of Apple Computer on Mar. 5, 1990.*

Irube et al., "Integrated Information and Communication System for Business Networks" *Hitachi Review* 40(3) :241–247 (1991).*

HMUX ERS "FDDI–II Hybrid Multiplexor (HMUX)" Rev. 2.4, (Mar. 25, 1991).*

On or about Nov. 1, 1991, IBM Corporation provided a "Task Order" and appendix. A copy of pp. 6 and 7 of the "Task Order" and appendix titled, "Isoethernet Project Local Cluster Controller Version 1.2".*

"Exchangeable Card Architecture Specification," Release 1.00, bearing the date Dec. 20, 1991, pp. 7, 20 and 22.*

"PCMCIA Socket Services Interface Specification," Draft 2.00b, bearing the date Jul. 17, 1992.*

"VersaNet™ An Ethernet Extension for Isochronous Communications" bearing the date Aug. 14, 1992 is a paper sent to National Semiconductor Corporation from Condor Systems, Inc. of San Jose, California on Aug. 18, 1992.*

IBM's Multimedia Venture: Opportunity for its Hardware?, vol. 38, No. 1930, p. 1, Sep. 21, 1992.*

"DP839XX Isochronous Time Slot Exchanger (IsoTSX™)", Revision 0.8, bearing the date Oct. 29, 1992 and "DP839XX Isochronous Ethernet Physical Layer isoPHY™" Revision 1.1, bearing the date Oct., 1992, were disclosed to International Business Machines.*

A disclosure of a communication system was presented at the IEEE 802.9 Standards Meeting on Nov. 8–12, 1992. The pages entitled "Multi–Media Applications are Ready".*

"National Proposes Isochronous Ethernet", *Electronic News*, vol. 38, No. 1940, p. 19, Nov. 30, 1992.*

IEEE 802.9 Draft Standard Integrated Services (IS) LAN Interface at the MAC and PHY Layers, Institute of Electrical and Electronics, Nov., 1992.*

"DP839XX Isochronous Ethernet Physical Layer Iso-PHY™," Revision 2.1, bearing the date "Dec., 1992" and "DP839XX Isochronous Time Slot Exchanger (isoTSX)," Revision 1.0, bearing the date Dec. 13, 1992, were disclosed to IBM and Ericsson.*

"DP839XX Isochronous Ethernet Physical Layer iso-PHY™" Revision 3.0, bearing the date "Dec., 1992" and "Isochronous Time Slot Exchanger (IsoTSX™) Workbook," Revision 1.2, bearing the date "Feb. 16, 1993" was disclosed to Luxcom, Inc. of Fremont, California.*

DP8390 Network Interface Controller: An Introductory Guide, Local Area Network Databook, National Semiconductor Corporation, pp. 1–206 to 1–213, 1992 Edition.*

DP83932B Systems–Oriented Network Interface Controller, Local Area Network Databook, National Semiconductor Corporation, pps. 1–288 to 1–383, 1992 Edition.*

DP83950A Repeater Interface Controller, Local Area Network Databook, National Semiconductor Corporation, pps. 3–3 to 3–73, 1992 Edition.*

DP83950EB at IEEE 802.3, Multi–Port Repeater Evaluation Kit, Local Area Network, Databook, National Semiconductor Corporation, pps. 75–87, 1992 Edition.*

"Fiber Distributed Data Interface (FDDI)–Token Ring Media Access Control (MAC)", American National Standard for Information System—Document ANSI X3.139, 1987.*

Loring Wirbel, "Scheme for Fast Ethernet Proposed", appears to be a newspaper article. Date of article is uncertain, but is believed to be prior to Mar. 1993.*

"Local Area Network Databook", National Semiconductor Corporation, pp. 1–3, 1–9, 1–242 to 1–248, 5–3 to 5–7, 1992.*

"Token–Ring Network Architecture Reference", pp. 5–1 through 5–28 and pp. 5–10 and 5–17, IBM, Third Edition, Sep. 1989.*

Harmonization of the ISDN D–Channel Link–Access Protocol with the IEEE 802.2 Logical Link Control, pp. 22.5.1–11.5.5, IEEE Globecom, 1988, by Cherukuri, et al.

Evaluation of Protocols from Formal Specifications: A Case Study with LAPD, pp. 506.1.1–506.1.8, IEEE Globecom, 1990, by Sherif et al.

A disclosure of a communication system was presented at the IEEE 802.9, Standards Meeting on Nov. 8–12, 1992. The pages entitled: "Multi–Media Applications are Ready".

"ATM Overview," National Semiconductor Corp., ATM Overview F–Fred Device, Aug. 1993, entire booklet.

"ATM User–Network Interface Specification: Version 3.0," Technical Committee of the ATM Forum, pp. iii–103.

"DP839XX Isochronous Time Slot Exchanger (IsoTSX™)," Revision 0.8, bearing the date Oct. 29, 1992 and DP839XX Isochronous Ethernet Physical Layer isoPHY™ Revision 1.1, bearing the date Oct. 1992, were disclosed to IBM.

DP839XX Isochronous Ethernet Physical Layer Iso–PHY™, Revision 2.1, bearing the date Dec. 1992 and DP839XX Isochronous Time Slot Exchanger, Revision 1.0, bearing the date Dec. 13, 1992, were disclosed to IBM and Ericsson.

DP839XX Isochronous Ethernet Physical Layer Iso–PHY™, Revision 3.0, bearing the date Dec. 1992 and Isochronous Time Slot Exchanger (IsoTSX™ Workbook, Revision 1.2, bearing the date Feb. 16, 1993, was disclosed to Luxcom, Inc. of Fremont, California.

"DP8390 Network Interface Controller: An Introductory Guide", Local Area Network Databook, National Semiconductor Corp., pp. 1–206 to 1–213, 1992 Edition.

"DP83950A Repeater Interface Controller," Local Area Network Databook, National Semiconductor Corp., pp. 3–3 to 3–73, 1992 Edition.

"DP83932B Systems–Oriented Network Interface Controller", Local Area Network Databook, National Semicondctor Corp., pp. 1–288 to 1–383, 1992 Edition.

Gallagher, C.A., "IEEE 802.9: A Multi–Service Lan Interface," Second IEEE National Conference on Telecommunications, Apr. 1989, York GB, pp. 173–178.

HMUX ERS "FDDI–II Hybrid Multiplexor (HMUX)," Rev. 2.4, Mar. 25, 1991.

IBM—On or about Nov. 1, 1991, IBM Corporation provided a "Task Order and appendix". A copy of pp. 6 and 7 of the Task Order and appendix titled, Isoethernet Project Local Cluster Controller Version 1.2.

"IBM's Multimedia Venture: Opportunity for its Hardware?," vol. 38, No. 1930, p. 1, Sep. 21, 1992.

"IEEE 802.3, Draft Supplement to IEEE Std 802.3 DSMA/CD Access Method and Physical Layer Specifications," Institute of Electrical and Electronics, Nov. 15, 1989.
"IEEE 802.9, Draft Standard Integrated Services (IS) LAN Interface at the MAC and PHY Layers," Institute of Electrical and Electronics, Nov. 1992.
"Integrated PBX Systems, An NCC State of the Art Report," The National Computer Centre Limited, 1987.
"ISDN Basic Rate Interface System Design Guide," Telenetworks document, Aug. 1989.
"ISDN Primary Rate Interface System Design Guide," Telenetworks document, Jul. 1989.
"IsoEnet Transforms LANs and WANs Into Interactive Multimedia Tools," Brian Edem et al., Computer Technology Review, Winter 1992, 3 pgs. "ISO/IEC 3309" International Standard, ref. No. ISO/IEC 3309; 1991 (E), 1991, 7 pgs.
"Local Area Network Databook" published by National Semiconductor, pp. 1–3 to 1–9, 1–242 to 1–248, 5–3 to 5–7.
Martini et al., "Real–Time Traffic in FDDI–II, Packet Switching vs. Circuit Switching," IEEE Infocom 1991, vol. 3, Apr. 1991, Bal Harbour, U.S., pp. 1413–1420.
"National Proposes Isochronous Ethernet," *Electronic News*, vol. 38, No. 1940, p. 19, Nov. 30, 1992.
Ross, F.E. et al., FDDI—A Lan Among Mans, Computer Communications Review, vol. 20, No. 3, Jul. 1990, New York, U.S., pp. 16–31.
Shimizu, H. et al., "IVDLAN Standardization and Development," IEICE Transactions, vol. E74, No. 9, Sep. 1991, Tokyo, JP, pp. 2696–2702.
"Token–Ring Network Architecture Reference," pp. 5–1 through 5–28 and pp. 5–10 and 5–17.
"VersaNet™ An Ethernet Extension for Isochronous Communications," bearing the date Aug. 14, 1992 is a paper sent to National Semiconductor Corp. from Condor Systems, Inc. of San Jose, CA on Aug. 18, 1992.
Wirbel, Loring, "Scheme for Fast Ethernet Proposed," appears to be a newspaper article; date of article is uncertain, but is believed to be prior to Mar. 1993.
Wong, David., "Second Generation 10Base T Silicon Solutions," IRE Wescon Convention Record, vol. 35, Nov. 1991, No. Hollywood, Ca. pp. 238–242.

* cited by examiner

NETWORK LINK DETECTION AND GENERATION

Matter enclosed in heavy brackets [ ] appears in the original patent but forms no part of this reissue specification; matter printed in italics indicates the additions made by reissue.

This application is a continuation-in-part of U.S. Ser. No. 07/971,018, filed Nov. 2, 1992, abandoned for "Network Link Endpoint Capability Detection," incorporated herein by reference.

The present invention is directed to a method and apparatus for generating and detecting, in a network, such as a local area network, the link signals transmitted to or received from one or more endpoints of a data communication link, and in particular to a method and apparatus for generating one or a plurality of different link signals and determining whether a data source/sink at the end of a datalink has the capability of first data communication protocol or a second data communication protocol.

BACKGROUND OF THE INVENTION

A typical data communication network is configured to operate according to a single predetermined protocol, e.g., an Ethernet protocol, a token ring protocol, other LAN protocols, or an isochronous protocol. An example of an Ethernet system is an implementation known as 10 Base T which is described in the draft Nine supplement to IEEE standard 802.3, dated Nov. 15, 1989. Other examples of data communication protocols are X.25, and the Token Ring System, described for example, by IEEE Standard 802.5. Both Ethernet and token ring systems convey data in packets but each uses a different media access method.

As shown in FIG. 1A, in a packet system, data is transferred in a plurality of packets 12a, 12b which can be either constant-sized or variable-sized. Each packet includes a field of data 14a, 14b which may be permeable information 16a, 16b housekeeping information such as data source information, data destination information, and the like 18a, 18b and a frame end marker 20a. As seen in FIG. 1A, because the fields provided for data 14a, 14b are not substantially continuous, the packetized scheme of FIG. 1A is not isochronous but "bursty" in nature.

In a token ring system, a node is permitted to transmit data only after receipt of an electronic "token." As depicted in FIG. 1B, a first station may transmit a token 22 which is received 24a by second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system.

FIG. 1C schematically depicts isochronous data transfer. In general terms, isochronous data is data which is non-packetized and of indeterminate, potentially continuous duration. In isochronous data transfer, the data transfer is initiated, such as by initiating a telephone conversation or beginning a video camera transmission 30. After the data transfer or connection is initiated, transmission of the data, possibly accompanied by transmission of housekeeping information (such as destinations, audio or video trimming, and the like) is provided substantially continuously for an intermediate period such as until termination of the connection 32. Although it may be that not every bit transferred represents a data bit (since "housekeeping" bits may also be transferred), the transfer of data is substantially continuous in the sense that there are no substantial periods during which no data bits are transferred. It is possible that the data being transferred is "Null" data such as silence during a telephone conversion or transfer of a black video image. One type of isochronous data transfer protocol is the Fiber Distributed Data Interface-II (FDDI-II) as described, for example, in FDDI-II Hybrid Multiplexer, Revision 2.4, dated Mar. 25, 1991.

Previous systems which were configured to use only a single-type protocol had the disadvantage that it was not possible to operate a mixed-protocol or "mixed-environment" system. Also when upgrading a network system, it was necessary to upgrade the entire system and it was infeasible or wasteful to upgrade only part of the system (such as only some of the nodes or such as upgrading nodes without upgrading hubs or upgrading hubs without upgrading nodes). Additionally, when a system or system components were installed, or repaired it was necessary for the installing personnel to be familiar with the particular single protocol for which the network was configured and to make such installation, upgrade, or repair in accordance with such a single protocol. Furthermore, it was necessary that apparatus connected to the system be configured for exclusive operation in accordance with the predetermined single protocol.

SUMMARY OF THE INVENTION

The present invention includes a recognition of the problems found in previous devices. According to an embodiment of the present invention an apparatus connected to one endpoint of a network link is able to detect which type of link signal, out of a number of possibilities is being received, thus indicating the protocol capability of the apparatus connected to the other end of the network link. In one embodiment, the apparatus is able to generate one of a plurality of link signals for transmission to the far end of the link, depending on the capabilities of each end of the link. Preferably, a first end of the network link has a capability of providing data communication under at least two different protocols and can select the appropriate protocol depending on what type of protocol capability is detected in the apparatus at the other end of the link.

Link endpoint capability detection takes advantage of the fact that different data communication protocols provide signals on the physical medium which have different characteristics. The various protocols can typically be detected by their unique timing and data patterns. According to one aspect of the invention, the network has a star topology with at least one hub and a plurality of nodes each node being connected to a hub by physical media constituting the link. The capability detection of the present invention can be performed by apparatus at either end of a link, and in particular, in a star topology network can be conducted by the hub or by any node. In one embodiment, capability detection is initiated by the hub. In a non-star topology at least one node can operate under two or more protocols and can detect the capability of another node with which it is connected.

Although, for convenience, much of the following description is in terms of hubs and nodes, aspects of the present invention can be implemented in topologies other than hub-and-node topologies (e.g., ring topologies, and tree topologies) as will be apparent to those of skill in the art. Descriptions of hub circuitry in the following can be implemented, e.g., on a PBX adapter card for a personal computer.

The apparatus which initiates capability detection, according to one embodiment, transmits a signal onto the physical medium. In one embodiment, the apparatus at the far end of the link outputs, onto the physical medium, a second signal. Preferably, a second signal will be output from the apparatus at the far end of the link, regardless or whether the apparatus at the far end operates according to a first protocol or a second protocol. However, the second signal which is placed onto the physical medium at the far end of the link has either a first form or a second form, depending on whether the apparatus at the far end has a first protocol capability or a second protocol capability. This difference in signal is detected at the first end of the link and this could be used as a basis for determining the protocol capability at the far end of the link.

In another embodiment, the first apparatus outputs a first signal. The second apparatus outputs a response only if it has a first protocol capability. If no response is output, the first apparatus outputs a second signal in an attempt to elicit a response according to a second protocol. This process can be repeated until the first apparatus outputs a signal to which the second apparatus responds, thereby indicating a protocol capability of the second apparatus.

According to one embodiment, the first signal which is output, also carries information regarding the protocol capability of the first endpoint. That is, preferably, the first signal has a first form if the first endpoint has a first protocol capability and it has a second form if the first endpoint has a second protocol capability. Preferably, the apparatus at the far end of the link will respond to either of these forms in the manner described above.

In the preferred embodiment, the apparatus which has detected the capability at the far endpoint adjusts its operation to accommodate that capability. For example, when the first endpoint detects that the far endpoint has a first protocol capability, the first endpoint will configure itself to conduct subsequent communication using the first protocol. However, if the first endpoint detects that the far endpoint has a second protocol capability, the first endpoint is able to configure itself to accommodate the second protocol capability.

In one embodiment the far endpoint will have only a single protocol capability. However, it is possible to configure a network in which both link endpoints have multiple protocol capabilities and both can detect one or more capabilities at the opposite endpoint. The endpoints can then configure themselves to operate at the best or most desired protocol level.

DESCRIPTION OF THE PREFERRED EMBODIMENT

Figure 1A:
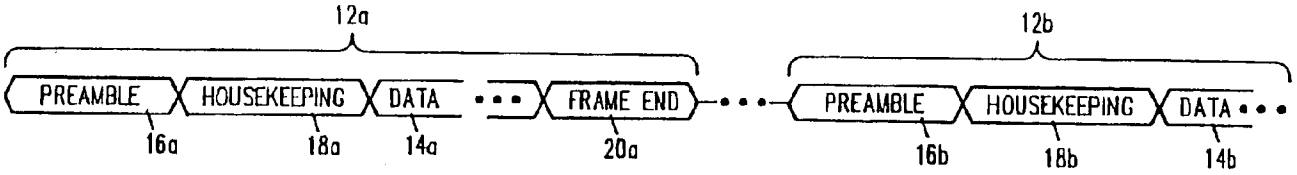
FIGS. 1A, 1B and 1C of the timing of a packet transmission system, a token ring transmission system, and an isochronous transmission system respectively.
Figure 1B:
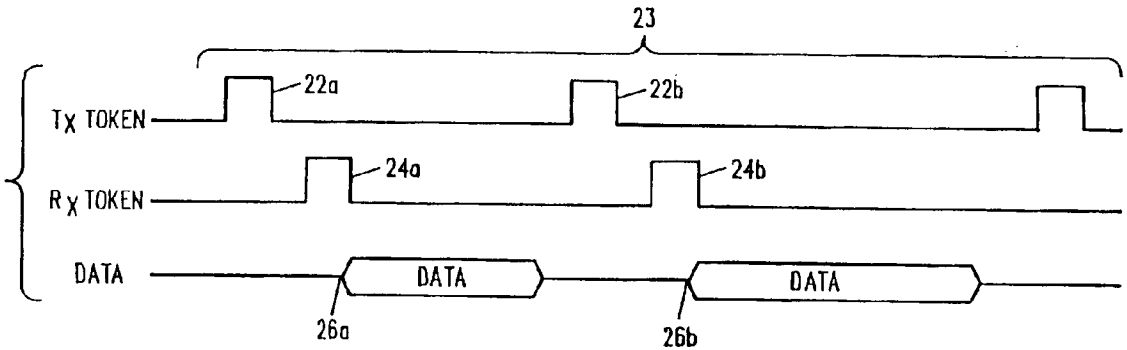
Figure 1C:
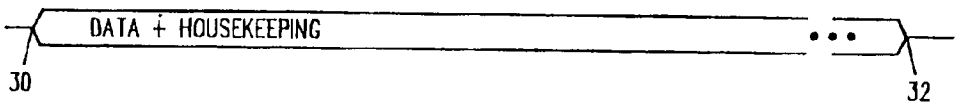
Figure 2:
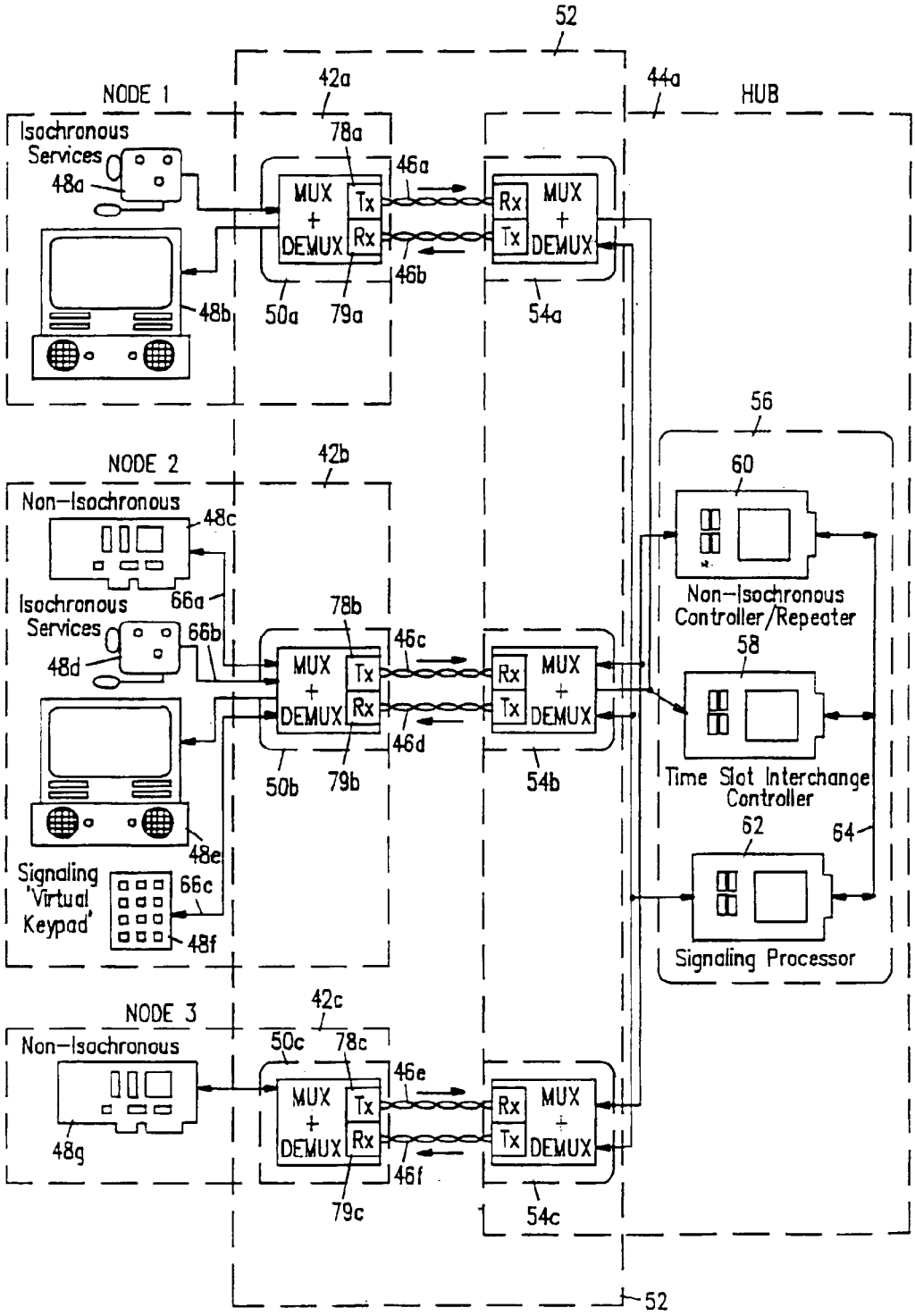
FIG. 2 is a schematic block diagram showing three nodes connecting to a hub.

Before describing link endpoint capability detection, a general description of one type of network will be provided as one example of a data communication system in which the present invention can operate. A data communication system can be configured in a star-topology with a plurality of nodes of 42a, 42b, 42c, (FIG. 2) each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each 42a, 42b, 42C includes circuitry 50a, 50b, 50c for receiving data, converting it to a form suitable for transmission onto the physical media 45a, 46c, 46e using transmitters 78a, 78b, 78c and receipt of signals from the physical media 46b, 46d, 46f using receivers 79a, 79b, 79c and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48a, non-isochronous sources and sinks such as an Ethernet media access controller 48c, 48g, and signaling or D channel sources and sinks such as an emulated or virtual key pad 48f provided, for example, on a personal computer (PC) terminal.

Each of the nodes 42a, 42b, 42c can include various types of sources and sinks such as strictly isochronous sources and sinks, such as depicted for node one 42a, strictly non-isochronous sources/sinks as depicted for node three 42c or both isochronous and non-isochronous sources and sinks as depicted for node two 42b. The physical layer 52 of the network system depicted in FIG. 2 has portions which include the physical medica 46a–46f and physical layer devices such as the node data receivers and converters 50a, 50b, 50c and the hub components 54a, 54b, 54c and 56. The physical layer can include devices for providing, e.g., transceivers for 10 Base T cables, data multiplexing, phase locked loop circuitry, FIFOs or other circuitry for cable length adjustment, smoothing, squelch and the like.

Figure 3:
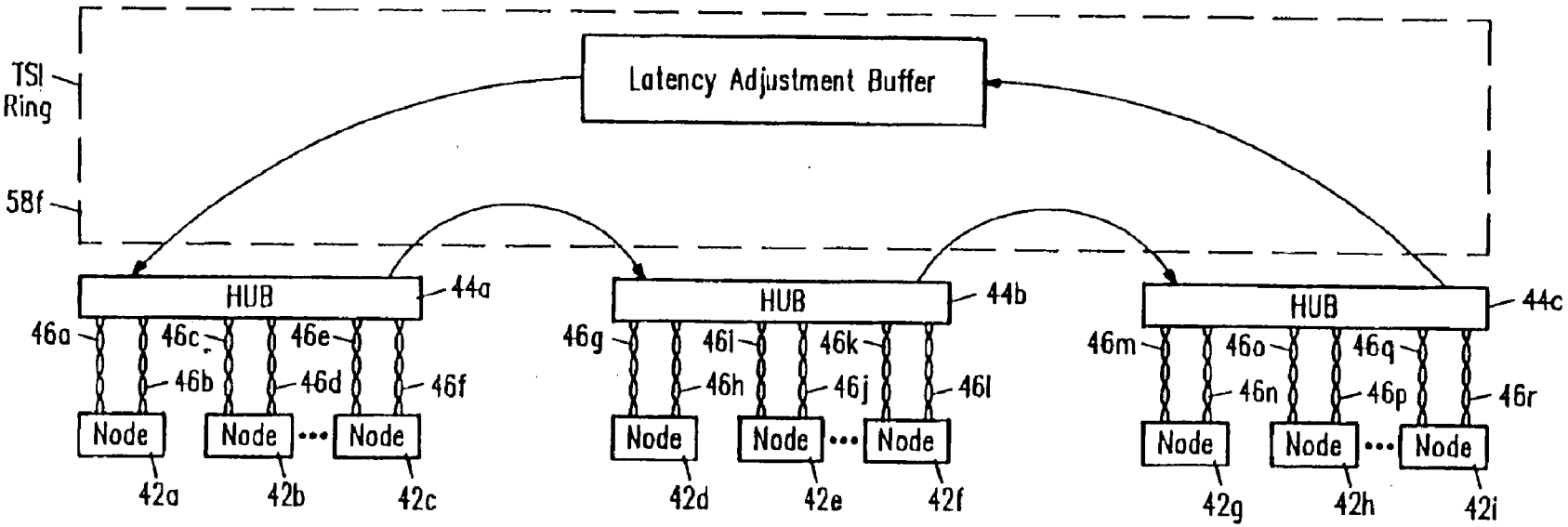
FIG. 3 is a schematic block diagram showing a number of hubs connected together using a ring structure.

The hub 44a includes circuitry 54a, 54b, 54c for receiving data from the physical media 46a, 46c 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller 58 for placing the data on a high-bandwidth bus (e.g., the TSI bus) so that it can be transported to destination nodes or other TSI controllers in the hub or other hubs (as depicted, e.q. in FIG. 3) and/or retrieved by hub circuitry 54a, 54b, 54c for transmission to various destination nodes 42a, 42b, 42c, e.g. by a local loopback capability. The separated non-isochronous data is provided to circuitry 60 configured to convey the non-isochronous data to one or more of the hub circuitry 54a, 54b, 54c for transmission to destination nodes 42a, 42b, 42c. In an embodiment in which non-isochronous-sourced data includes Ethernet data, the hub circuitry 60 can be a standard Ethernet repeater processor. In this way, the present invention can be at least partially backward-compatible with previous Ethernet hub systems. The D channel and M channel information is provided to a signaling processor 62 which performs various maintenance and control functions such as identifying and alerting users of error conditions, and setting up requested calls or connections, i.e. source/destination paths e.g. by communicating with the isochronous and non-isochronous controllers 58, 60, e.g. over data path 64. The isochronous controller 58 can be, a data exchanger e.g. an isochronous switching device, such as that described in commonly-assigned application Ser. No. 08/146,337 entitled "Time Slot Exchanger Switching Mechanisms in a Network for Data Communication Having Isochronous Capability," filed on even date herewith and incorporated herein by reference. The non-isochronous controller 60 can be, e.g., an Ethernet repeater. As depicted in FIG. 3 a number of star-topology systems can be interconnected by connecting hubs 44a, 44b, 44c to one another, e.g. by a time slot interchange (TSI) ring.

According to the present invention, data communication can be provided according to one or more of a number of protocols. Those skilled in the art are familiar with protocols, but in general, a "protocol" includes a standard set of rules that specify the format, timing, sequencing and/or error checking for data transmission. Several network protocols are referenced above, including an Ethernet protocol such as 10 Base T, an isochronous protocol such as FDDI-II, and a token ring protocol. Another possible protocol is one in which both isochronous and non-isochronous data are combined into a frame structure for transmission across physical media. A frame-structure protocol of this type is described in greater detail in commonly-assigned application Ser. No. 07/969,916 titled "Network for Data Communication with Isochronous Capability" filed on Nov. 2, 1992 and incorporated herein by reference. According to one such protocol, the incoming data from the various sources is provided to a multiplexer 70 (FIG. 4) which performs time-division multiplexing on a four-bit basis. The pattern for the time division multiplexing is a repeating series of frames or templates. In this embodiment, the frames are repeated every 125 microseconds. The time division multiplexing is a multiplexing of isochronous-sourced data and non-isochronous-sourced data. The non-isochronous-sourced data can be data provided in accordance with a number of previously-available LAN systems and this protocol will be referred to, in general, as "isochronous-LAN" protocol. Several particular types of isochronous-LAN protocols are possible. When the isochronous data is multiplexed with LAN data which is provided according to an Ethernet protocol, such as a 10 Base T Ethernet protocol, the resulting time-division multiplexed protocol will be referred to as an "Isochronous-Ethernet" protocol. When the isochronous data is multiplexed with LAN data which is provided according to a token ring protocol, the resultant time multiplexed protocol will be referred to as an "isochronous-token ring" protocol.

The present invention will be described below by way of a particular example in which one available protocol is an Isochronous-Ethernet protocol and another potentially available protocol is a 10 Base T protocol. However, as will be clear to those skilled in the art, the present invention can also be used in connection with other combinations of protocols such as isochronous-token ring or other isochronous-LAN protocols, pure isochronous protocols such as FDDI-II, and can include three or more protocols.

Tables IA and IIB depict manners in which the various data streams, and additional data and control bytes can be time-division multiplexed in an Isochronous-Ethernet protocol. Each symbol in the Tables IA and IB represent four bits of data so that every group of two symbols represents one 8-bit byte of data. In Table IA, E represents four bits of data from the non-isochronous Ethernet stream 66b (FIG. 4), B designates four bits of data from the isochronous stream 66a, D represents four bits of data from the signaling or D channel stream 66c, and M represents four bits of M channel data stream 66d. In addition, certain byte-length patterns are provided. JK represents a frame synchronization pattern and EM (the first two bytes of block three in Table IA represents an Ethernet "pad" followed by a maintenance byte. As seen in Table IA each frame contains 256 bytes which can be considered in thirty-two groups of eight bytes each, or four blocks of sixty-four bytes each. The frame structure is described more thoroughly in commonly-assigned application Ser. No. 07/969,911 titled "Network for Transmitting Isochronous-Source Data with a Frame Structure" filed Nov. 2, 1992 and incorporated herein by reference. Frame structures other than that described in Table IA may be used to allocate bandwidth according to a particular purpose. Table IB shows one of the many alternate formats. In general, Table IB is similar to Table IA with replacement of "E" symbols with "B" symbols. As seen in Table IB, the last one or two bytes in each block are "Idle" data bytes.

Figure 4:
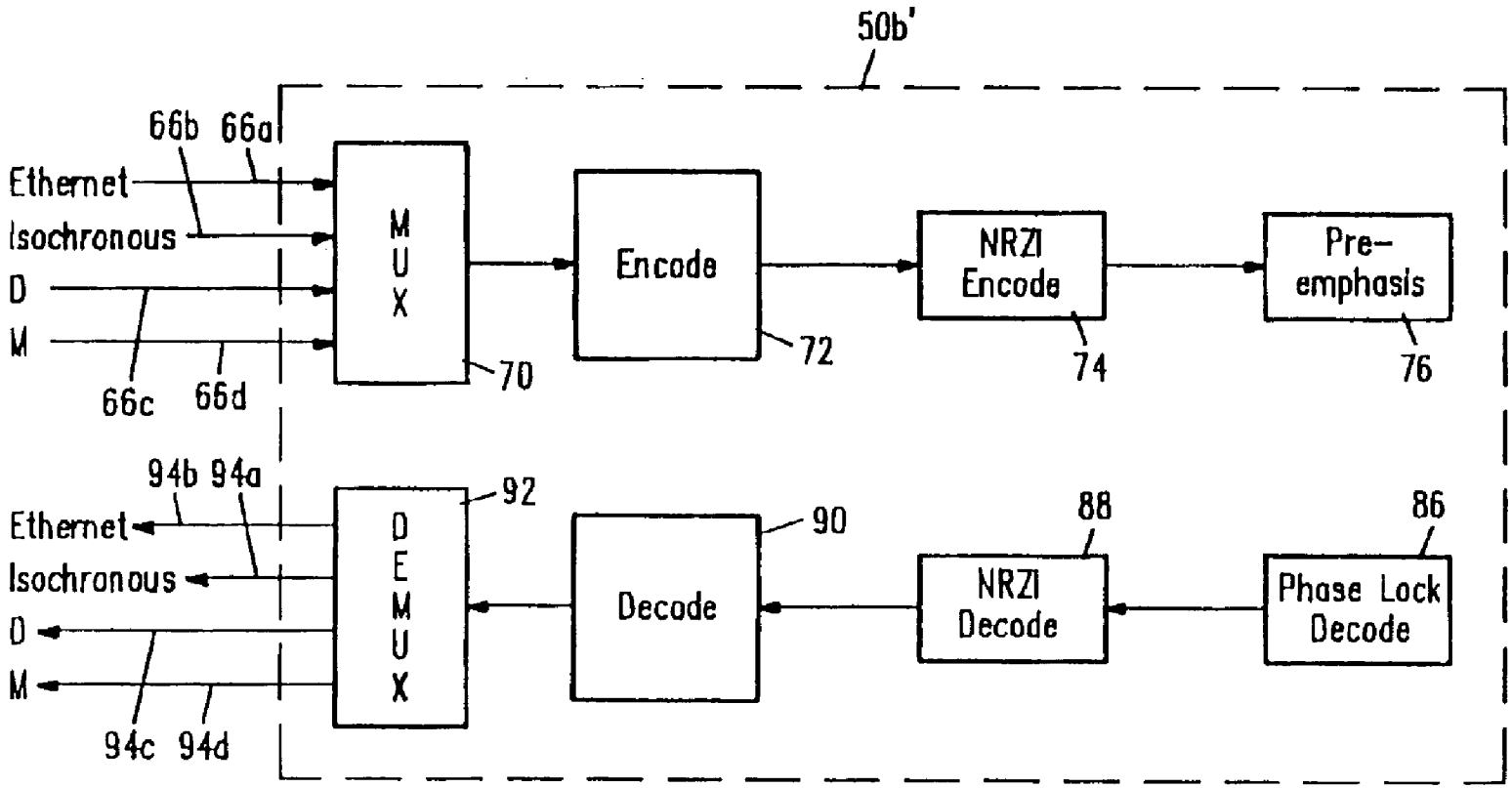
FIG. 4 is a schematic block diagram of circuitry for multiplexing and preparing data for transmission over to media and for receiving information from the media and demultiplexing the data.

As shown in FIG. 4, the time-multiplexed data is then encoded by an encoder 72. In the depicted embodiment, the encoder performs four/five encoding. One particular form of four/five encoding conforming partially to the ANSI X3T9.5 standard, is depicted in Table II. The encoding scheme depicted in Table II is described in greater detail in commonly-assigned application Ser. No. 07/970,329 titled "Frame-Based Transmission of Data" filed on Nov. 2, 1992 and incorporated herein by reference.

The output from the encoding devices is sent to pre-emphasis circuitry 76. The pre-emphasis circuitry compensates the signal transmitted onto the physical medium to reduce the jitter. The data output by the pre-emphasis circuitry 76 is sent to a transmitter or driver 78b and the signal is transmitted over the physical medium 46c. The physical medium 46c can be any of a number of media types including twisted pair, coaxial or fiber optic cable.

Figure 5:
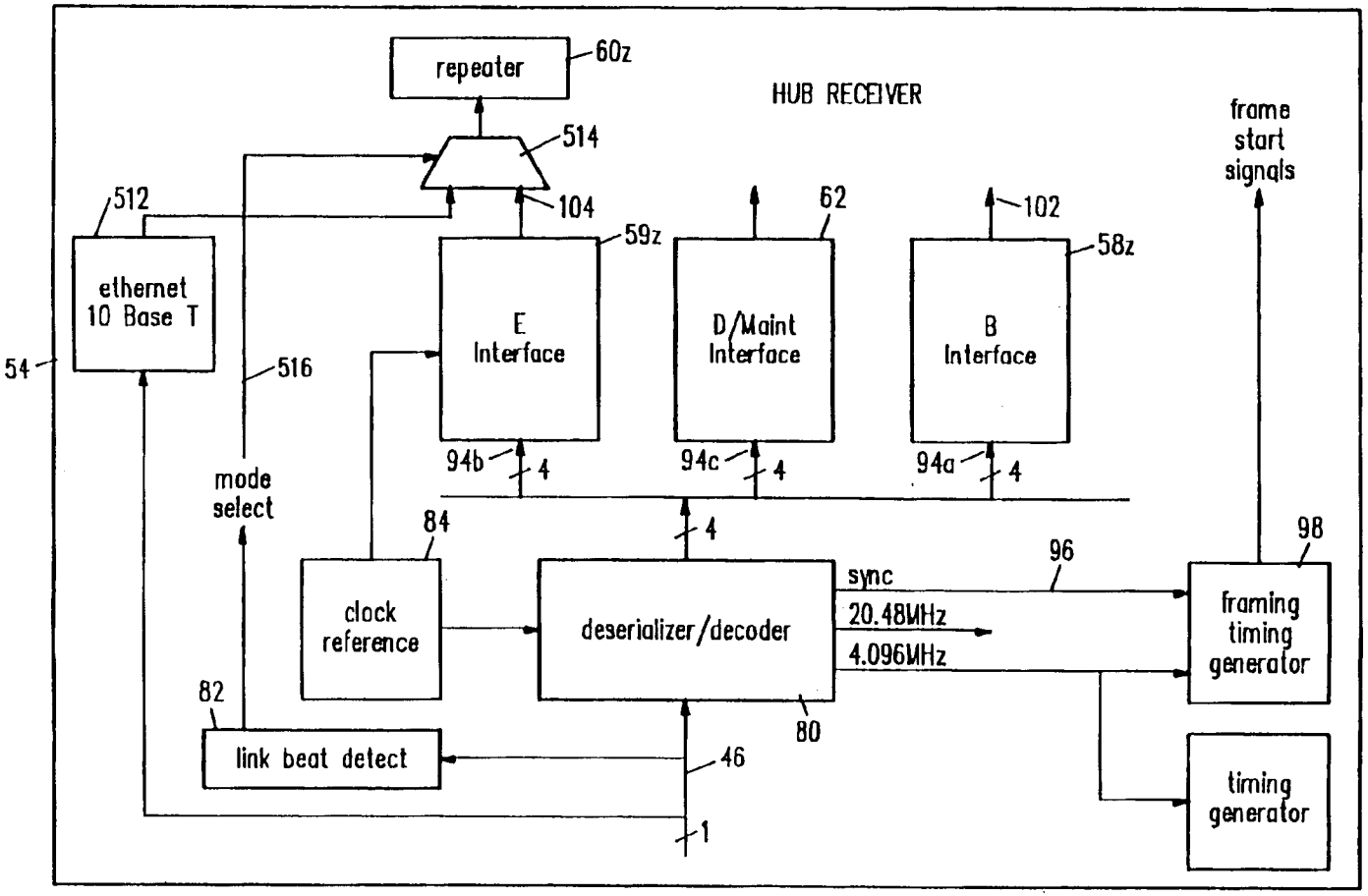
FIG. 5 is a schematic block diagram of hub receiver circuitry according to an embodiment of the present invention.

The data sent over the physical layer interface is received in the hub 44a. The hub contains a plurality of circuit devices 54a, 54b, 54c, each one coupled to one of the nodes 42a, 42b, 42c by the physical media 46. As depicted in FIG. 5 the data transmitted over the physical media 46 arrives serially at a de-serialized/decoder 80. Link detect circuitry 82 also receives the data from the physical layer portion interface for detection of the mode or protocol in which the node is operating as described more fully below. The de-serializer/decoder 80 receives a reference clock signal 84. The de-serializer/decoder includes circuitry which is functionally an inverse of the multiplexing/encoding circuitry described above. Referring to FIG. 4, the de-serializer/decoder includes phase lock decode circuitry 86, the results of which are provided on NRZI decoder circuitry 88 which, in turn, provides the decode results to four/five decode circuitry 90, in turn providing results to a de-multiplexer 92 which separates the received data into the isochronous-sourced data 94a, the non-isochronous-sourced data 94b and signaling data, such as D channel and M channel data 94c. The de-serializer/decoder 80 also outputs a synchronization signal, derived from the JK frame synchronization symbols 96 for use by a framing timing generator 98.

Both the non-isochronous-sourced data 104 (FIG. 5) and the isochronous-sourced data 102 are made available to the various hub circuitry 56 or components 54a, 54b, 54c, as needed for transmission back to destination nodes. In one embodiment, the separated isochronous data 102 and non-isochronous data 104 are reconfigured by the respective interfaces 58, 60 to provide isochronous output 102 and non-isochronous output 104 in a form suitable for processing so as to provide the data as needed for transmission to the destination nodes via the physical layer. In one embodiment, the non-isochronous data 94b can be configured by the physical layer E interface 59 (FIG. 5) so that the output data 104 can be processed by a repeater device 60 for eventual transmission to destination nodes. As an alternative to using a repeater for the non-isochronous data, packet connections may be linked through media access control layer bridges. Preferably, the output data 104 is in a form such that it can be handled by repeater circuitry of types previously available. For example, when the nonisochronous data 94b within the physical layer is data which originated at the node 42b from an Ethernet MAC, the output data 104 is in a form such that it can be handled by a standard Ethernet hub repeater 60 such as DP83950 "Receptor Interface Controller" (RIC) available from National Semiconductor Corporation, Santa Clara, Calif.

As shown in FIG. 5, the data received over the physical link 46 is also provided to an additional interface for handling data according to a second protocol, as described more thoroughly below. For example, when the second protocol is an Ethernet 10 Base T protocol, a 10 Base T interface 512 can be provided. The 10 Base T receive interface 512 can be a standard 10 Base T interface, such as Model DP83922 "Twisted Pair Transceiver Interface" (TPI) available from National Semiconductor Corporation, Santa Clara, Calif. A multiplexer 514 determines whether the repeater 60 receives a data stream from interface 59z or the 10 Base T interface 512. This selection by the multiplexer 514 is controlled by a mode select signal output over control line 516 from the link beat detect circuit 82 as described more fully below.

Figure 6:
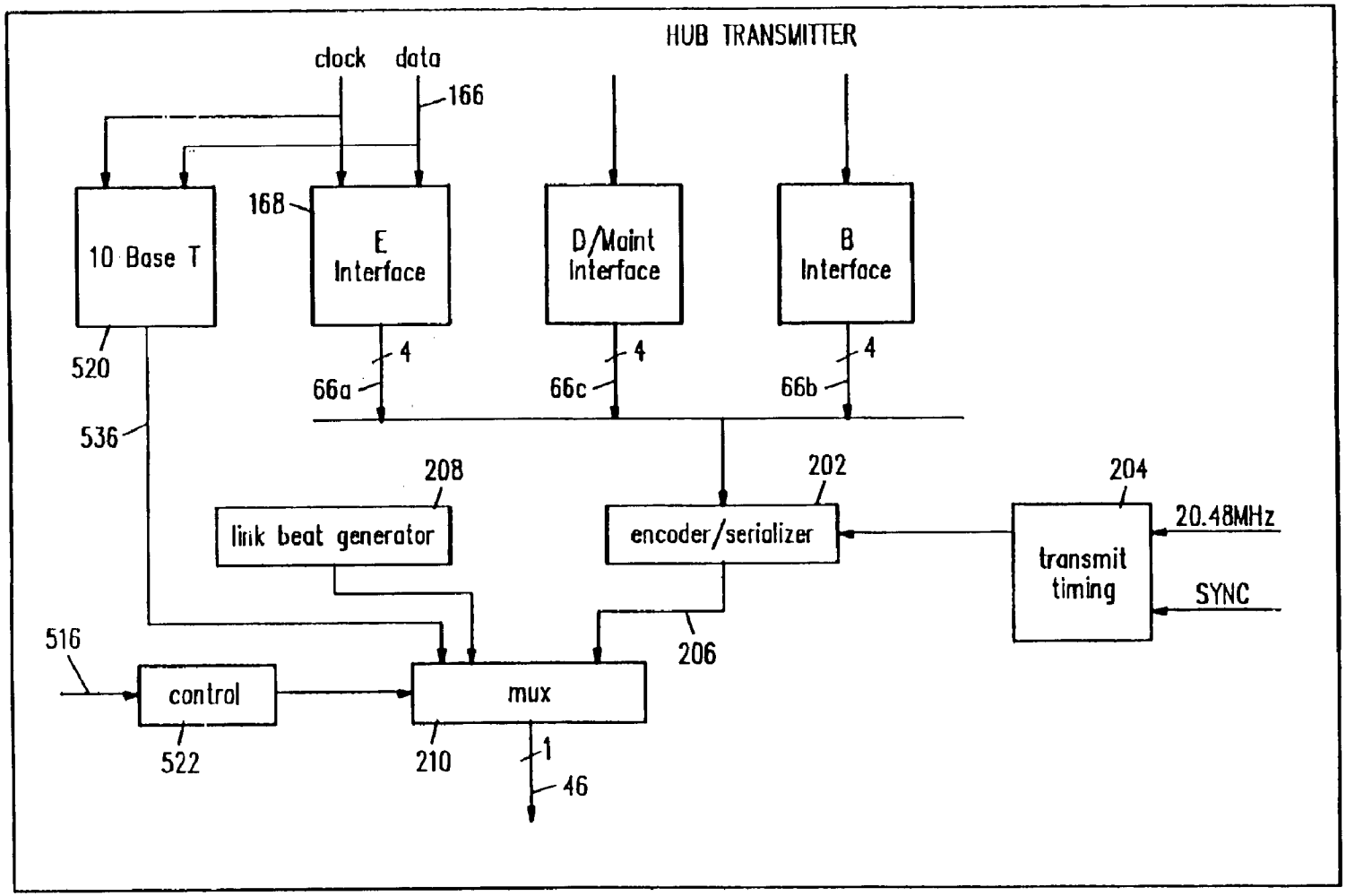
FIG. 6 schematic block diagram of a hub transmitter-circuitry.

The data 198 output from the E transmit interface 168 is provided along with isochronous data output 164 and M channel D channel data 170 to encoder serializer circuitry 202, depicted in FIG. 6. The encoder/serializer 202 is configured substantially like the encoding circuitry found in the node and depicted in FIG. 4. Specifically, the encoder/serializer 202 provides a multiplexer for combining the three streams of data 198, 170, 164, a four/five encoder, an NRZI encoder, and pre-emphasis circuitry. The timing of transmission is controlled by transmit timing circuitry 204. Output 206 from the encoder/serializer is selectively combined with link beams from a link beat generator 208 by multiplexer 210 for purposes of link end point detection, as described below. The clock signal and the data 166 from the repeater 60, in addition to being provided to the E interface 168 is also provided to a second interface which operates according to a second protocol. When a second protocol is an Ethernet 10 Base T protocol, the interface is an Ethernet 10 Base T interface 520. The Ethernet 10 Base T interface transmit 520 can be of a type substantially identical to 10 Base T interfaces provided in previous apparatus such as Model DP83922, "Twisted pair Transceiver Interface (TIP)" available from National Semiconductor Corporation, Santa Clara, Calif. The output from the Ethernet 10 Base T interface 520 is provided to the multiplexer 210. Multiplexer 210 is able to select, in response to a control signal 522, whether to output data originating from the repeater 60 according to a first protocol determined by the E interface 168, or according to a second protocol determined by the Ethernet 10 Base T interface 520, as described more fully below. The data sent from the hub 44a to the nodes 42 is sent in a frame format which is preferably substantially the same as the frame format used for the data sent from the nodes 42 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a de-multiplexer 92. Decoded and de-multiplexed data is then delivered to the various data sinks in the nodes 42.

Figure 7:
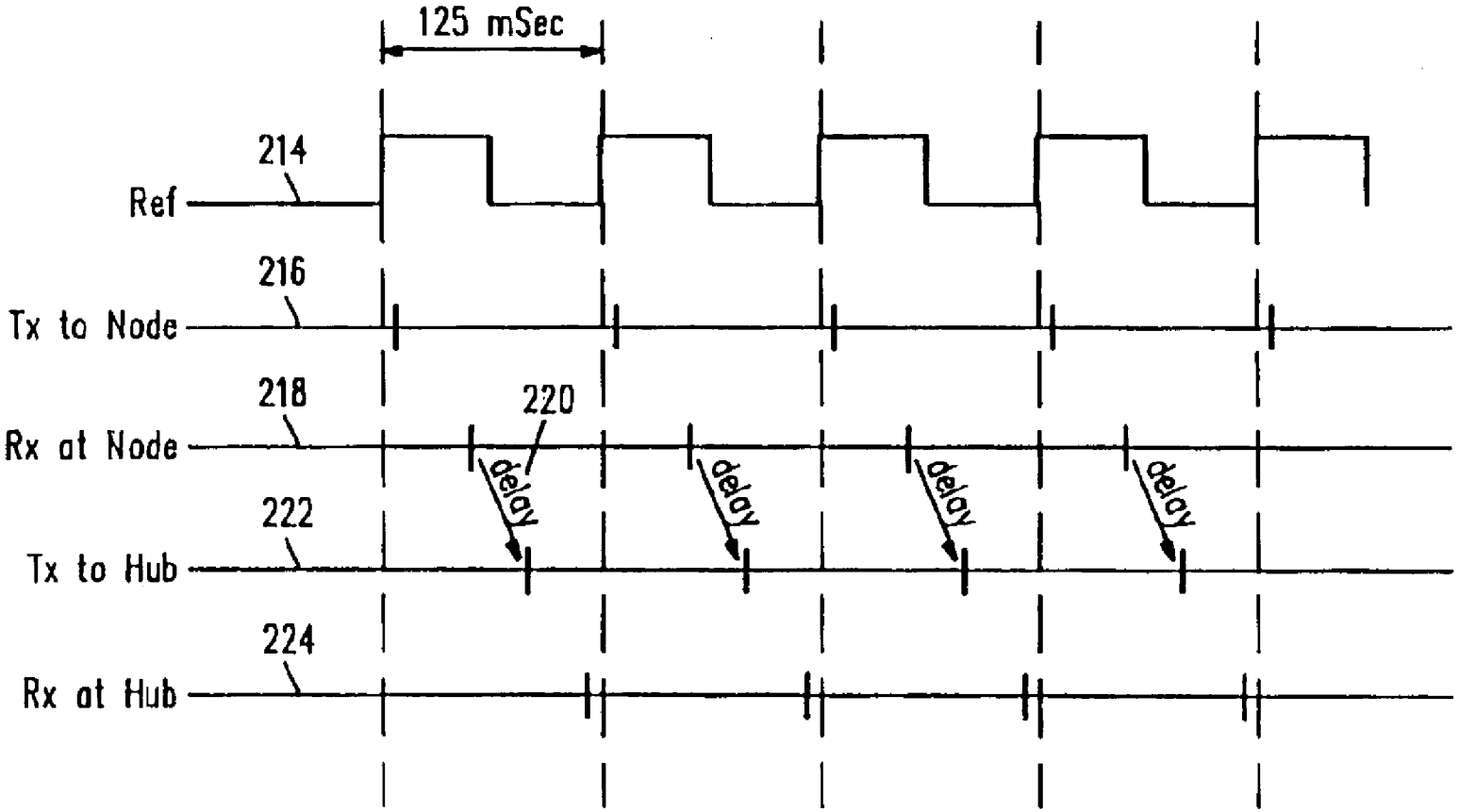
FIG. 7 in a timing diagram showing the relative timing of transmissions and receptions at the hub and nodes.

As shown in FIG. 7, the timing of the system can be synchronized with a 125 microsecond reference clock signal 214. In this example, the reference signal 214 provides an ascending clock edge every 125 microseconds. The reference signal can be provided by any of a number of sources. Preferably, an embodiment of the present invention is configured to permit a reference signal 214 to be synchronized to an external clock reference, such as a reference signal from a wide area network or from a FDDI-II ring. The reference signal can be supplied through one of the nodes and transmitted to the hub for distribution to the other nodes, or can be supplied directly to the hub for distribution.

Figure 8A:
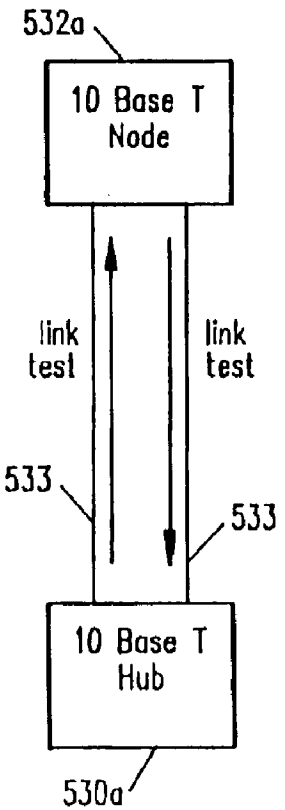
FIGS. 8A–8E are block diagrams depicting link endpoint capability detection for five different network configurations according to embodiments of the present invention.

FIG. 8A depicts a network configuration in which the hub 530a in a 10 Base T hub and the node 532a is a 10 Base T node, both of which are found in previously-available devices. In this system, the 10 Base T hub sends a signal, specifically a link test pulse, in accordance with IEEE Standard 802.3, over the physical medium to a 10 Base T node 532a. In a typical system, the 10 Base T hub outputs a signal upon being powered-up. The link test pulse used in previous devices is described in IEEE Standard 802.3. Briefly, a link test pulse can be described as a single 100 nanosecond pulse occurring at a nominal 16 millisecond interval. The 10 Base T node 532a, typically in response to being powered-up, outputs onto the physical medium a second signal, which, in accordance with IEEE 802.3, is substantially identical to the above-described link test pulse. This link test pulse is received by the 10 Base T hub 530a. At this point, a 10 Base T hub proceeds to operate on the basis that is connected to a 10 Base T node (532a) and the node 532a begins to operate on the basis that it is connected to a 10 Base T hub (530a) and normal 10 Base T communication protocol.

Figure 8B:
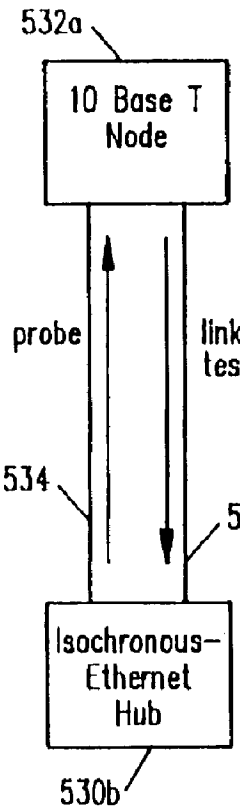

FIG. 8B depicts a configuration according to one invention in which an Isochronous-Ethernet hub 530b is connected to a 10 Base T node 532a. The Isochronous-Ethernet hub outputs a probe signal 534. A probe signal differs from the link test pulse in that it has a faster link beat, for example having a beat period of less than about 2 milliseconds. The 10 Base T node 532a is configured substantially identically to previously available 10 Base T nodes. Upon receipt of the probe pulse 534, it continues to output a link test pulse onto the physical medium. The isochronous-Ethernet hub 530b, upon receiving a link test pulse (rather than a probe pulse) can determine, on that basis, that the apparatus connected to the far end of the physical medium is a 10 Base T node 532a (rather than, for example, an isochronous-Ethernet node). Preferably, the isochronous-Ethernet hub 530b is capable of handling data either according to an isochronous-Ethernet protocol or a 10 Base T protocol. Upon receiving a link test pulse and determining that the node 523a is a 10 Base T node, the isochronous-Ethernet hub 530b will configure itself to conduct all future communications with node 532a using a 10 Base T protocol.

Although FIG. 8B shows only a single node 532a connected to the hub 530b, in a typical configuration, a plurality of nodes will be connected to each hub. Preferably, the hub 530b is capable of using different protocols with different nodes. Accordingly, an isochronous-Ethernet hub which is connected to both a 10 Base T node and an isochronous-Ethernet node can determine the capability of each node to which it is connected and can use the appropriate protocol for each node.

Figure 8C:
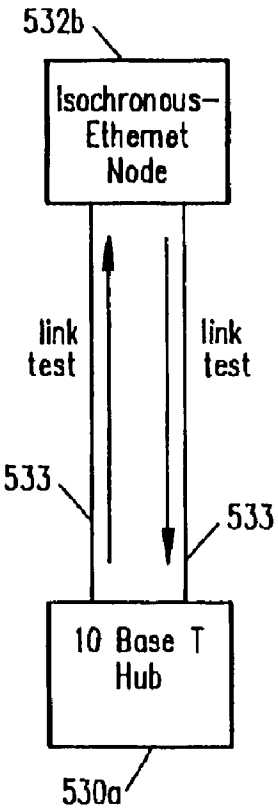

FIG. 8C depicts a network configuration in which a 10 Base T hub 530a is connected to an isochronous-Ethernet node 532b. Upon initialization of the system the 10 Base-T hub outputs a link test pulse 533. In the depicted embodiment the Isochronous-Ethernet node 532b can operate according to an Isochronous-Ethernet protocol. Therefore, upon receiving the link test pulse 533, it outputs a link test pulse 533. Accordingly, the 10 Base T hub 530a can only send Ethernet data and no isochronous data.

Figure 8D:
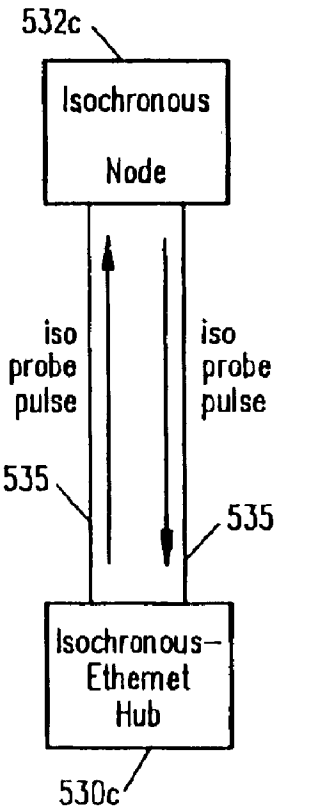

FIG. 8D depicts a network configuration in which an Isochronous-Ethernet hub 530c is connected to an isochronous node 532c. In the embodiment depicted in FIG. 8D, the node 532c only has isochronous protocol capability, but the hub 530C has both an isochronous-Ethernet protocol capability and an isochronous protocol capability. In this embodiment, upon initialization of the system, the hub 530c outputs an isochronous probe pulse 535. The isochronous node 532c, upon receiving the isochronous probe pulse 535, can determine that the hub to which it is attached is an isochronous-capability hub and will configure itself to conduct all future communications with the hub 530c according to an isochronous protocol. Thus, the isochronous node 532c preferably contains isochronous apparatus similar to apparatus found in the hub 503c for detecting circuitry at the other end of the link or physical medium and thereafter, using the appropriate protocol. The isochronous node 532c, in response to receipt of the iso probe pulse 535, outputs an iso probe pulse 535. The hub 530c, upon receipt of the iso probe pulse, will commence normal isochronous hub operations.

Figure 8E:
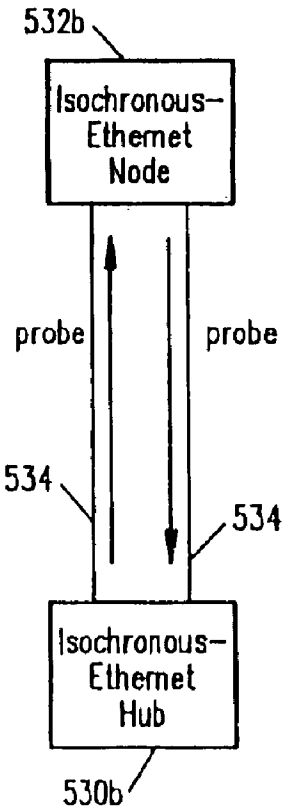

FIG. 8E a configuration in which an Isochronous-Ethernet hub 530b is connected to an Isochronous-Ethernet node 532b. When the system is initialized the Isochronous-Ethernet hub 530b outputs a probe signal such as an isoEnet probe, on the physical medium. When the Isochronous-Ethernet node 532b receives the isoEnet probe signal it is able to determine that the hub to which it is connected is an Isochronous-Ethernet hub. The Isochronous-Ethernet node 532b then outputs an isoEnet probe signal 534 onto the physical medium which is received by the isochronous Ethernet hub 530b. When the Isochronous-Ethernet hub 530b receives an isoEnet probe signal it can determine that the node 532b to which it is connected to an Isochronous-Ethernet node and will conduct all future communications with this particular node according to the Isochronous-Ethernet protocol.

FIGS. 5 and 6 depict components in the hub which are used in connection with link endpoint capability detection. As depicted in FIG. 6, a link beat generator 208 is provided for outputting the appropriate probe signal. A control signal 522 controls the multiplexer 210 so that the probe signal 208 is output onto the physical medium 46 at the appropriate time, e.g., upon initialization of the network system.

Figure 9:
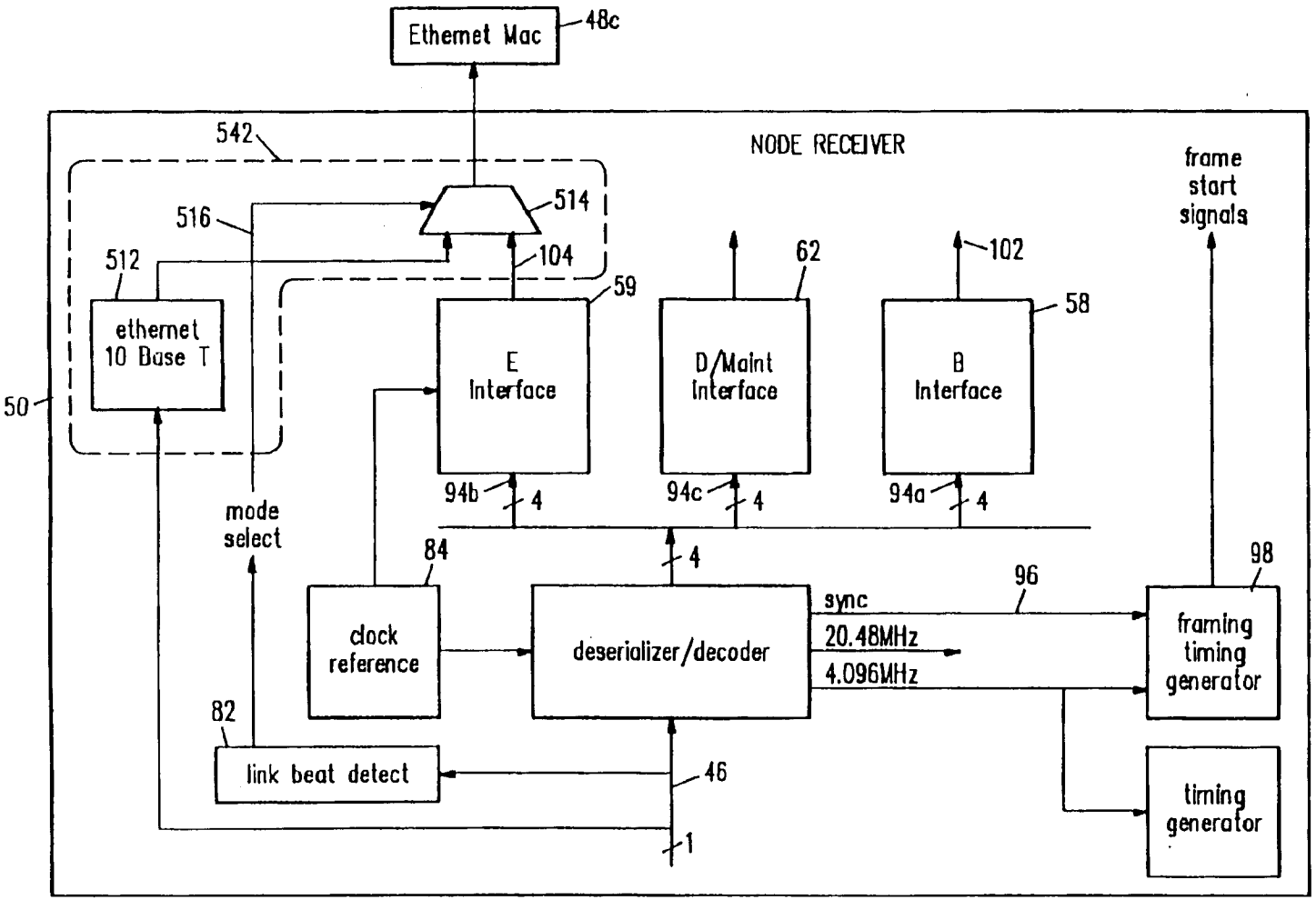
FIG. 9 is a block diagram of a node receiver, according to an embodiment of the present invention.

FIG. 9 depicts circuitry 50 in an Isochronous-Ethernet node. Circuitry 542 would be provided in a node which can operate in accordance with two protocols. Nodes which provide only a single protocol would not include circuitry 542 and the E interface 59' would be connected directly to the Ethernet MAC 49c. The probe pulse received over the physical medium 46 is detected by the link beat detector circuitry 82. Circuitry 82 can include, for example a state machine, for detecting the sequence and interval of the pulse or link test pulse. The link beat detector circuitry 82 outputs a mode select signal 516 for controlling the multiplexer 514. The control signal 516 is configured to set the multiplexer 514 such that the Ethernet MAC 48C is connected to the output of the Isochronous-Ethernet interface 59' so that future data received over the physical medium 46 is treated in accordance with the Isochronous-Ethernet protocol. If the link beat detector 82 detects the link test pulse rather than an iso pulse signal, it outputs a mode select signal 516 which configures the multiplexer 514 to connect the Ethernet MAC 48C with the Ethernet 10 Base T interface 512 so that future data received over the physical medium is treated in accordance with Ethernet 10 Base T protocol. The mode select signal 516 also provides a signal to a control circuit in a node transmitter. The node transmitter is not separately depicted in detail since it is substantially identical to the hub transmitter depicted in FIG. 6.

The node transmitter control 522 in response to the node select signal 516 (indicating receipt of a link test pulse or other probe pulse) configures the multiplexer to output an appropriate pulse signal from the link beat generator 208 onto the medium 46. In some embodiments, nodes and/or hubs are configured to output a link test pulse or a probe pulse (depending on the capability of the hub or node), whenever the hub or node is powered-up. For embodiments in which the link beat detector 82 is able to discriminate between a link test pulse and a probe signal such as an iso probe pulse, the mode select 516 can configure the link beat generator 208 to output a link test pulse in response to a link test pulse and an iso probe pulse in response to a probe signal. The signal output by the node transmitter is received in the hub receiver 54 (FIG. 5). The hub receiver link beat detect circuitry 82 detects the output of the probe pulse from the node transmitter. When the signal is a probe signal, circuitry 82 outputs a mode select signal 516 which is effective to control the multiplexer 514 to connect the output from the E interface 59' to the repeater 60. In this way, the hub receiver is now configured to process future signals received from the node over medium 46 according to an Isochronous-Ethernet protocol. The node select signal 516 also provides an input to control signal 522 which, in response, configures the multiplexer to place the output 206 from the encoder/serializer 202 onto the physical medium 46, rather than using the output from the 10 Base T interface 536. In this way, the transmitter is now configured to output data according to the Isochronous-Ethernet protocol.

If the signal output from the node is a link test pulse rather than probe pulse, the link beat detector 82 outputs a mode select signal 516 which configures multiplexer 514 to connect the Ethernet 10 Base T interface 512 with repeater 60 and configures the multiplexer to send output 536 onto the physical medium 46, rather than output 206.

Figure 10A:
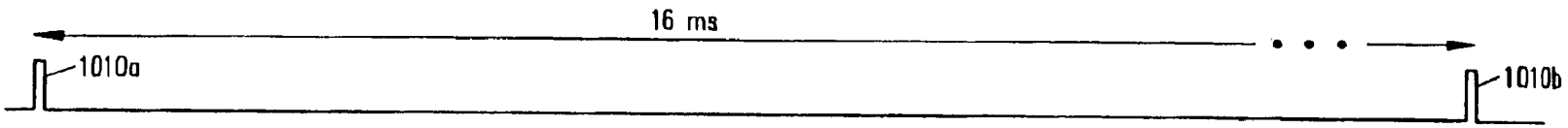
FIGS. 10A, 10B and 10C depict timing of 10 Base T link pulses, isolink pulse stream and isosleep link pulses, respectively.
Figure 10B:
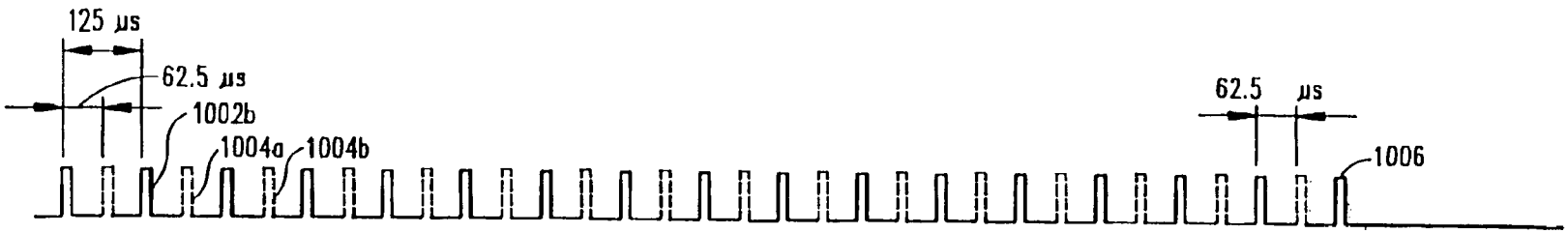

In one embodiment, generation and detection of link pulses involves a number of changes of state, as described below by way of state machine descriptions and diagrams. In one embodiment, the operation can be described by three state machines, a first state machine for generating various types of link pulses ("LINKGEN"), a second state machine for detection of a 10-Base T link ("LINKIOBTSM") and a state machine for detection of isochronous or Isochronous-Ethernet pulses or fast link pulses ("LINKISOSM"). 10 Base T link pulses are transmitted and, in turn, detected on both sides of the medium such as the twisted pair medium, to signal the proper connectivity. In isochronous systems, the fast link pulses are generated during power-on initialization, during traumatic error recovery, or when a connection is running on a emergency power. Fast link pulses can be differentiated from 10 Base T link pulses since the fast link pulses occur in bursts rather than singly. A third type of link pulse "isosleep" is used to indicate that the device originating the pulses is in a low power or "sleep" mode and to convey cycle timing. Low power mode is described in commonly assigned application, U.S. Ser. No. 08/147,359 for "Low Power Isochronous Networking Mode" filed on even date herewith and incorporated herein by reference. The 10 Base T link pulses have the form of a 100 ns pulse generated every 16 ms (FIG. 10A). In the depicted embodiment, the isolink pulse stream consists of pulse pairs. Each pair consists of a clock pulse and a data link pulse. In the depicted embodiment, the spacing between the clock pulse is 125 μs. This value is preferred because it is the same as the public network time and it is a clock time that is readily available to the system, as described above. The clock and data link pulses are separated from each other by 62.5 microseconds. The pairs are repeated 16 times and, following the 16the transmission of a pulse pair, an additional link pulse 1006 is transmitted 62.5 microseconds after the last data link pulse position. The isolink pulse stream is depicted in FIG. 10B. As shown, clock link pulses 1002a, 1002b always occur, while data link pulses 1004a, 1004b occur to represent a data "1" (shown in phantom) and are missing to represents a data "0". Thus, the isolink pulse stream can be used to transmit information and, in one embodiment, is used to encode information such as the type of device which is transmitting, (e.g., hub versus node) the isoethernet signaling data rate, and the information content of the isoetherent channel (e.g., clear channel, ATM mode, isochronous Ethernet).

Figure 10C:
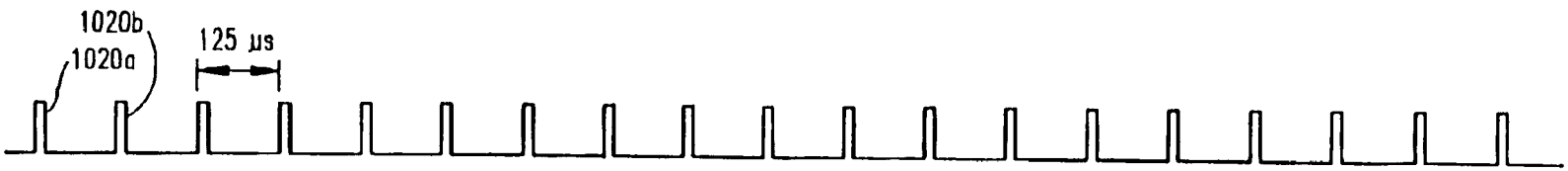

The isosleep link pulses consist of one plate 1020a, 1020b transmitted every 125 μs in phase with the transmit sync signal, as depicted in FIG. 10C.

In one embodiment, the hub initially begins generating an isoethernet "fast" link pulse to each node to which it is connected. If the far end is a 10 Base T node, this node will begin transmitting a 10 Base T link pulse after it has received the pulse or pulse train sent from the hub. If a 10 Base T node at the far end fails to receive a proper link pulse or stream of link pulses, it will enter a "link loss" state in which it will remain until it receives a specific sequence indicating that the network or link is now operable again. When the hub receives a 10 Base T link pulse from the node, it will configure itself to thereafter send out 10 Base T communications to that node.

If the far end of the link was an isoethernet node, the isoethernet node will respond to receipt of a proper isoethernet pulse train (fast link) by transmitting an isoethernet pulse train (fast link). Thereafter, both ends of the link will configure themselves to transmit in isoethernet mode.

In this way, the hub will be assured that the communication link is working properly in both directions. In certain previous systems, communications did not require a "handshake," i.e., verification of properly working link in both directions and accordingly, in these previous devices it was possible for there to be a partially broken link (i.e., a link which was operating in one direction and not the other) that went undetected.

Figure 11:
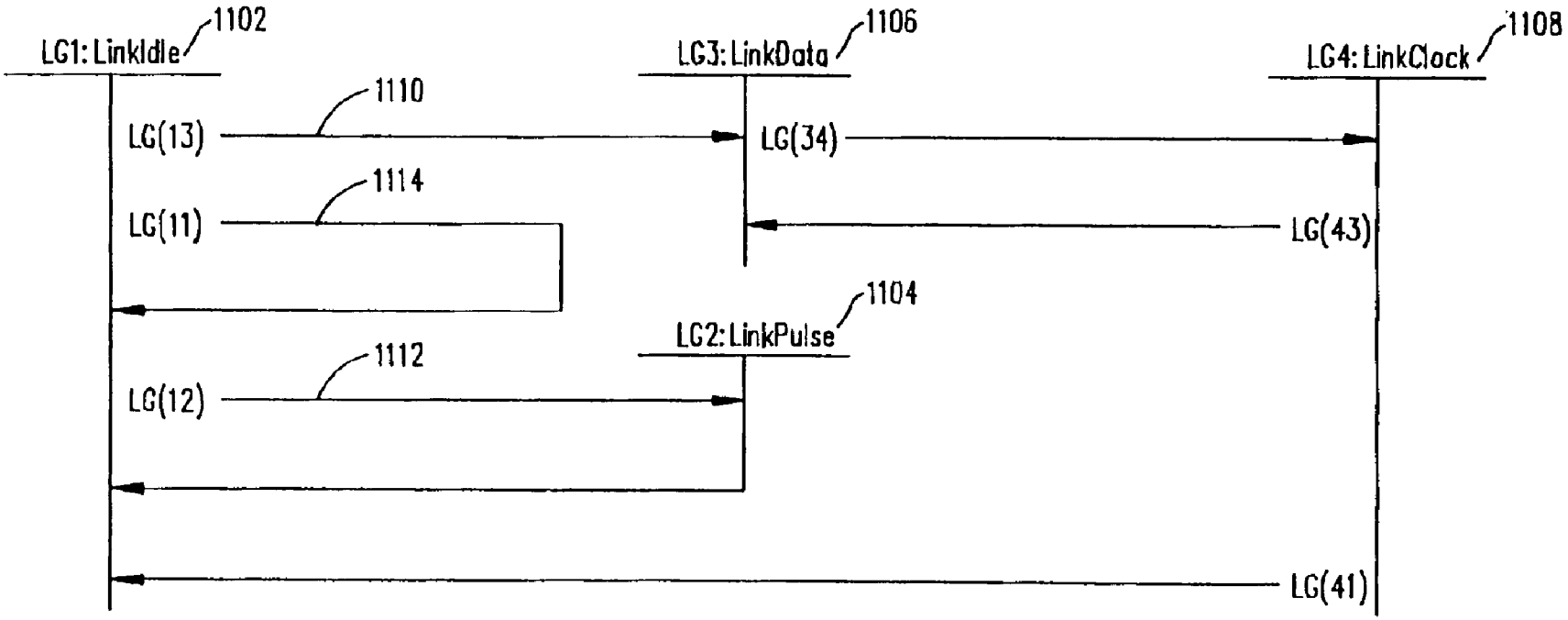
FIG. 11 depicts a state machine for generating various types of link pulses.

FIG. 11 depicts the LINKGEN state machine according to one embodiment of the invention. As seen in FIG. 11, this state machine has four states. State LG1 "LINKIDLE" is an idle state in which the link generator state machine is waiting for an event to generate a link pulse. State LG2 1104 is a link pulse state. The machine waits at this state for approximately 250 ns until the end of the interval when the cycle synchronization symbol is sent before generating a data link pulse. State LG3 1106 is the link data state. The machine waits at this state to generate a data link pulse. State LG4 1108 is the link clock state. The machine waits at this state to generate a clock link pulse. Equations governing the transition between states in pseudo "C" terminology are provided in Table III. In each case, the first line indicates the condition which causes the transition of state to occur and the remaining lines indicate values that are assigned, incremented, cleared or reset. The meanings of terms of Table III are provided in Table IV.

As seen from FIG. 11, the state machine leaves the link idle state under three conditions. The first 1114 is a 10 Base T link pulse timeout designated LG11. After waiting 16 ms from the previous link pulse, a link pulse is generated. In the isosleep link pulse timeout designated LG12 (1112), after waiting 125 μs from the previous link pulse, a link pulse is generated. In the isolink link pulse timeout designated LC13 (1110), after waiting 16 ms from the previous link pulse, a link pulse stream will be generated.

The state machine leaves the link pulse state 1104 after generating a link pulse. In the isolink data wait, after generating a link pulse, the machine makes a transition to begin timing the data link pulse. In the isolink clock wait, after generating a data link pulse, the machine makes a transition to begin timing the clock link pulse.

The machine leaves the link data state in either of two conditions. In the isolink 1 data pulse, after waiting a half cycle, a data link pulse will be transmitted. In the case of an isolink 0 data pulse, after waiting a half cycle, no data link pulse will be transmitted.

The machine leaves the ink clock state 1008 in the case of an isolink clock pulse. After waiting a half cycle, a clock link pulse will be transmitted.

Figure 12:
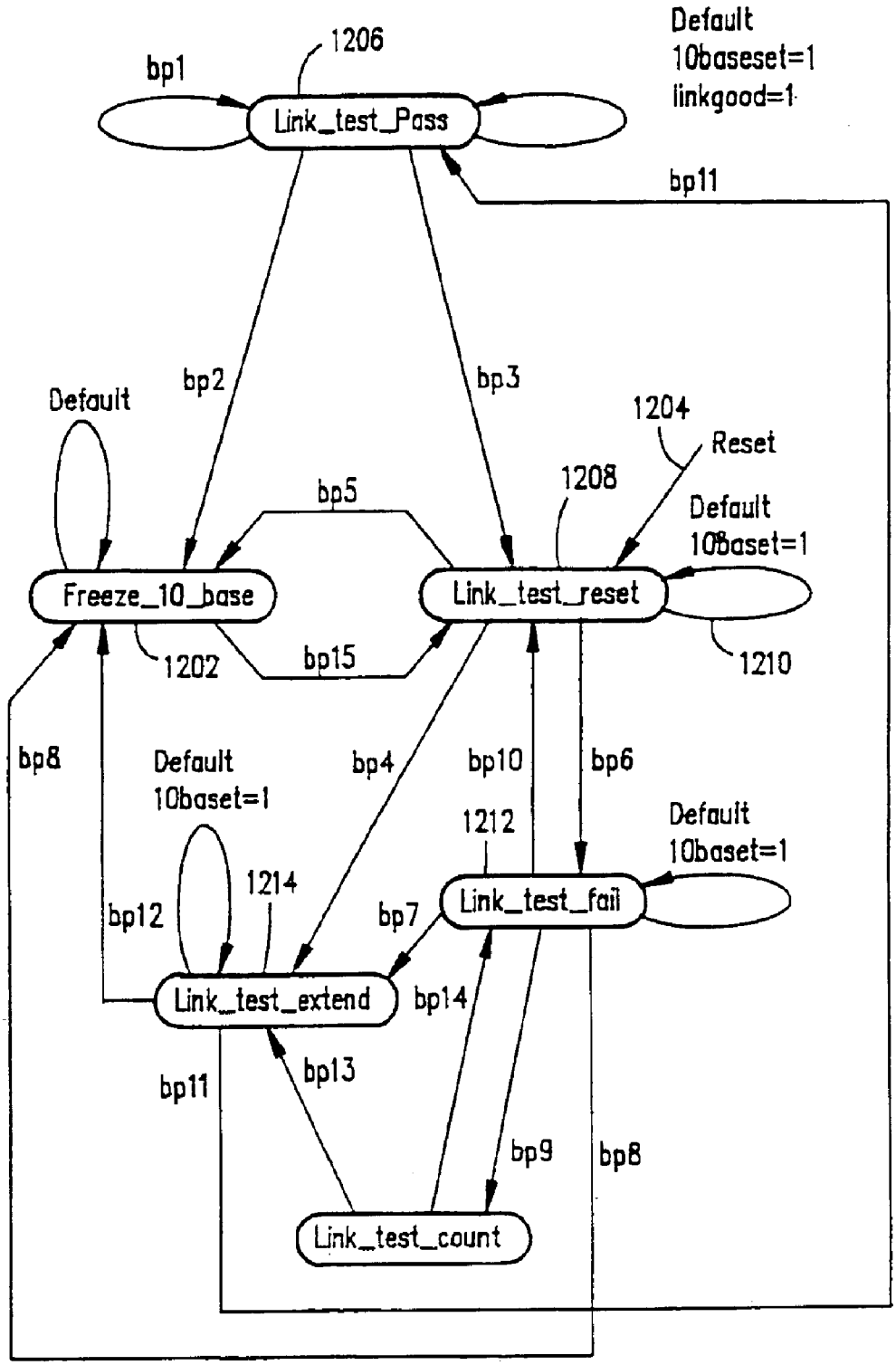
FIG. 12 depicts a state machine for detection of 10 Base T links.

The 10 Base T link detection state machine ("LINK10BTSM") is depicted in FIG. 12. This state machine can be compared to the 10-Base T detector described in IEEE Standard 802.3. However, the state machine depicted in FIG. 12 includes the state "freeze-10-Base" 1202 which acts to disable this machine when fast link pulses are detected. Table V indicates the conditions for the various transitions shown in FIG. 12 and the variable assignments that are associated with each transition.

Table VI indicates the meaning of various parameters. Following a reset 1204, the machine will enter the link test reset state 1208. From this state, the machine will either remain in this state 1210, transition to the link test fail state 1212, transition to the link test extend state 1214 or transition to the freeze-10-base state 1202. The transition to the freeze-10-base state occurs if the fastlink parameter is "true". The same conditions will also cause a transition from the link test fail state 1212 or the link test extend state to the freeze-10-Base state. Once in the freeze-10-Base state 1202, the state machine will, by default, remain in this state 1202 as long as the fastlink parameter is "true." In this situation the freeze-10-base state will transition to the link test reset sate 1208. In this way, the state machine will respond to receipt of a normal 10-Base T link pulse but will enter the freeze state 1202 in response to receipt of a fast link pulse.

Figure 13:
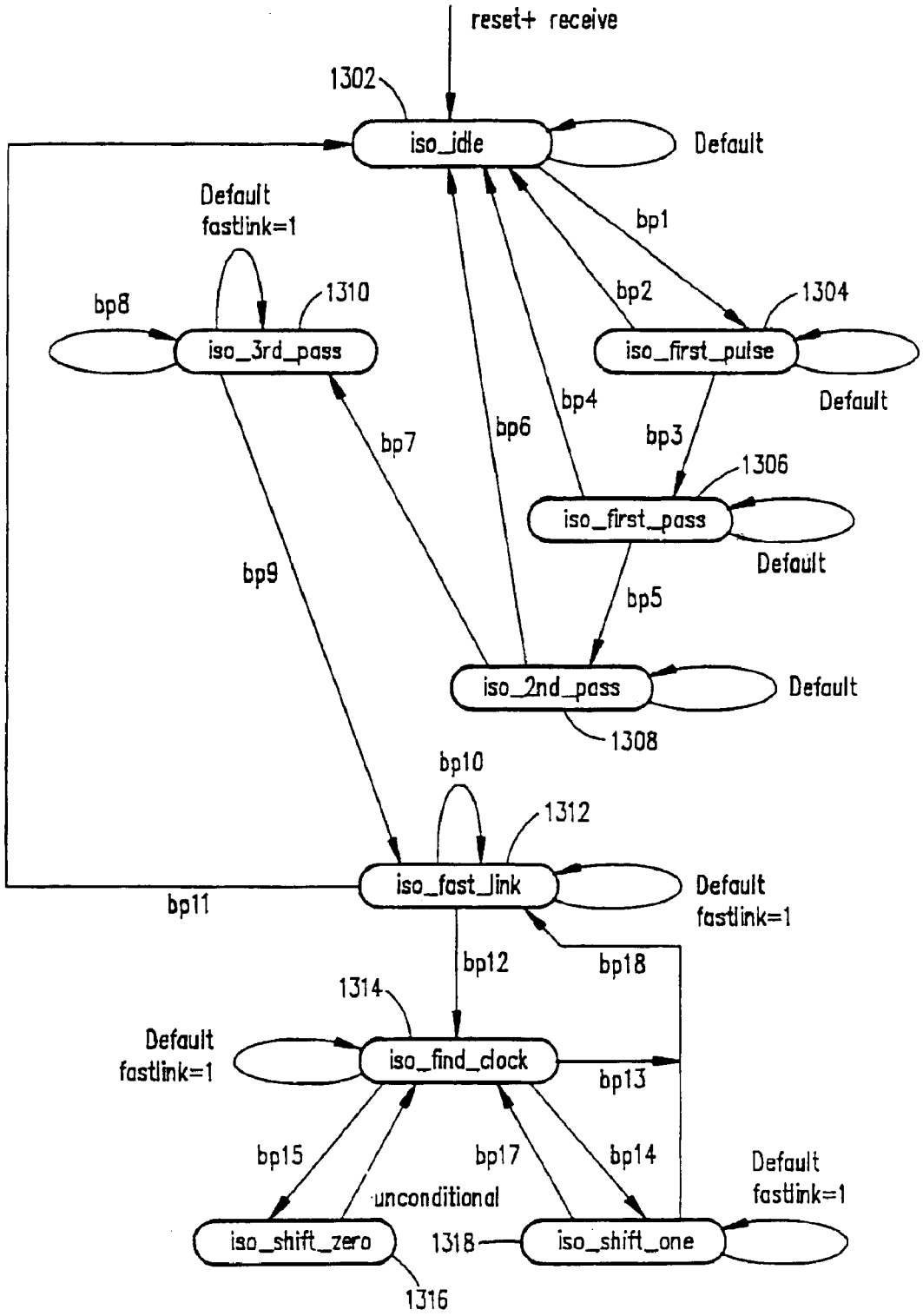
FIG. 13 depicts a state machine for detection of isochronous or isochronous-ethernet pulses or fast link pulses.

The state machine which detects a fast link pulse ("LINKISOSM") is depicted in FIG. 13. Table VII indicates the conditions which cause state transitions as well as the assignment of variables or parameters associated with state transitions. Table VIII indicates the meaning of the various parameters.

The state machine depicted in FIG. 13 has nine separate states. The iso-idle state 1302 is entered upon reset or receive activity. The isofirst pulse state 1304 is entered when a link pulse is detected but at a point when it does not yet qualify as a fast link pulse. The isofirst pass state 1306 is entered when a qualified fast link pulse is detected. The isosecond pass 1308 state is entered when a qualified second link pulse is detected. The isothird pass state 1301 is entered when a qualified third link pulse is detected. The isofast link state 1312 is entered after the requisite number of fast link pulses has been detected, but when the machine is waiting for data information or a clock pulse. The isofind clock state 1314 is entered when a clock pulse within a burst is detected. The isoshift 0 state 1316 is entered when 0 data pulse is detected and the isoshift 1 state 1318 is entered when a 1 data pulse is detected.

Figure 14:
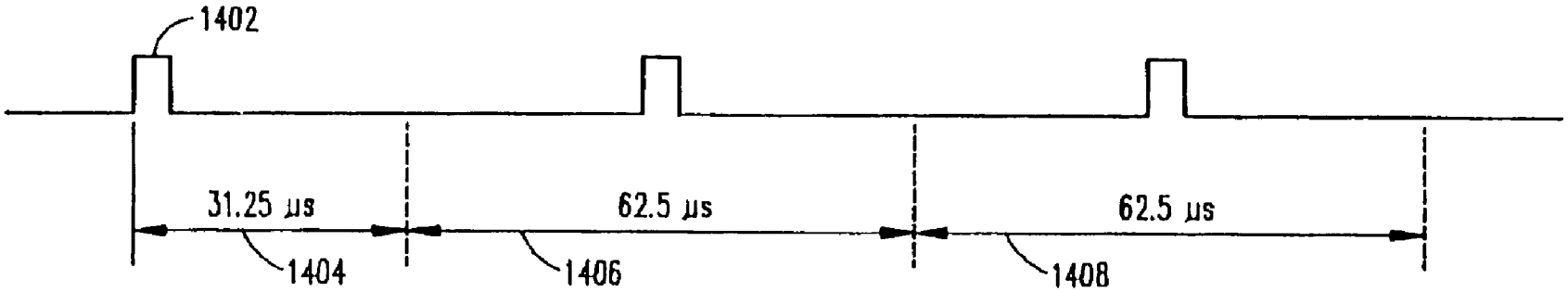
FIG. 14 depicts pulses for defining acceptance windows.

To distinguish between a clock pulse and a data pulse, a series of acceptance windows are defined from the beginning of the first pulse which is assumed to be a clock pulse. As depicted in FIG. 14, at the beginning of the first clock pulse 1402, a first acceptance clock window 1404 of 31.25 μs is defined. Thereafter, a series of acceptance windows, alternating between an acceptable data window 1406 and an acceptable clock window 1408 are defined, each of these windows having a duration of 62.5 μs.

Figure 15D:
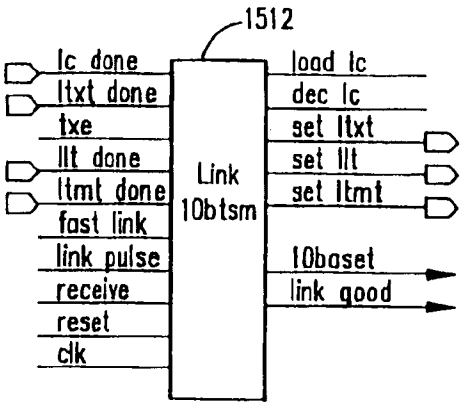
FIGS. 15A–15D are block diagrams depicting circuitry components that can be used to implement state machines according to one embodiment of the invention.
Figure 15C:
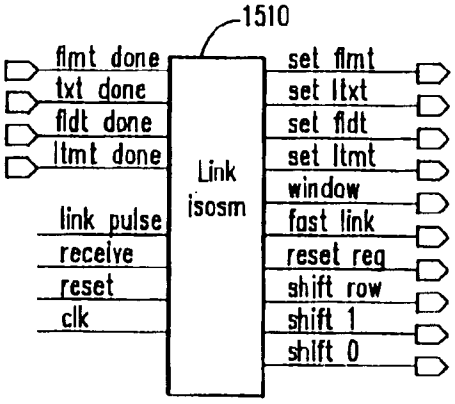
Figure 15A:
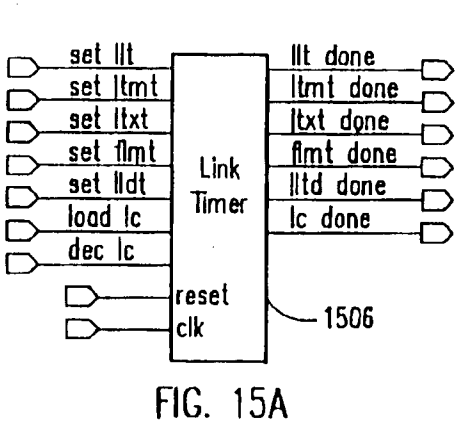
Figure 15B:
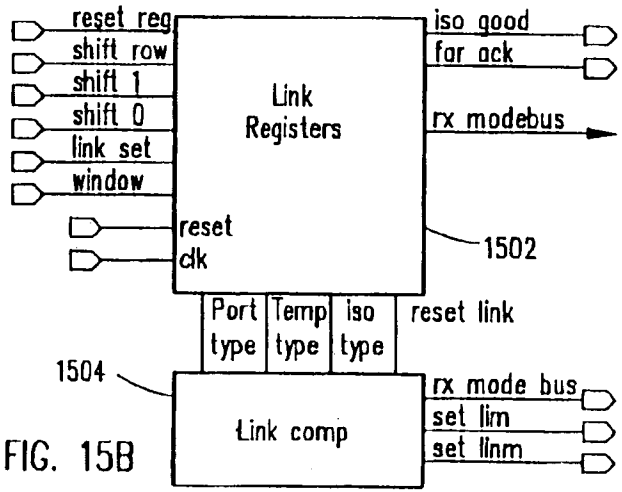

The state machines, described above, can be implemented in the context of a number of circuitry components. In one embodiment, the circuitry components include a link timer, FIG. 15A, a number of link registers 1502 (FIG. 15B), coupled to a link comparator 1504, the link ISO state machine (FIG. 15C) and the link 10 Base T state machine (FIG. 15D). Table IX describes the function of the various signal lines depicted in FIG. 15A–15D, not previously described.

In general, the link timer circuit 1506 provides a number of timers which are used by the state machines to distinguish between pulse signals and other signals and to distinguish between various types of pulses and pulse streams, as described above. A number of the timers found in these circuits, and the function and default valves, are listed in Table X.

The link registers 1502 are used for storing information, including information encoded in the data pulses of the isoethernet pulse stream and for outputting information, such as information extracted from the data pulses.

In view of the above description, a number of advantages of the present invention can be seen. The present invention allows a network to be configured in a mixed protocol or mixed environment, with, for example, a single hub connected to a plurality of nodes which operate according to different protocols, with the configuration being achieved automatically, with the need for manually establishing a predetermined protocol beforehand for each node. The present invention permits networks to be upgraded incrementally so that it is not necessary to upgrade all nodes at the same time. Furthermore, it is not, in general necessary for service personnel to specifically configure nodes or hubs to accommodate particular protocols since the protocols are determined automatically and the nodes and hub configure themselves in accordance with the determined protocols.

A number of variations and modifications of the present invention can be used. Although an embodiment involving a 10 Base T protocol and an Isochronous-Ethernet protocol was described, the present invention can be made applicable to other protocols, including other LAN protocols such as a token ring protocol, an isochronous protocol and the like. Although the present invention described one particular signal characteristic used for determining the protocol, other characteristics could also be used. For example, a token ring could be detected by the presence of four or 16 Mbit/sec Manchester-encoded data. Other LANs can be detected by their unique timing and data patterns. Protocols could also be detected using such characteristics as the pattern of the presence or absence of a carrier, and the frequency spectrum of signals placed onto the physical medium. When a node has a capability of communicating under two or more protocols, e.g. either an Isochronous-Ethernet protocol or a pure Ethernet protocol, it would be possible for a hub to use both capabilities of a node, i.e., to communicate according to a first protocol during a first time period and a second protocol during a second time period. Although the present invention has been described in the context of a star topology, the invention could also be used in a non-star topology, such as a ring topology or a tree topology. The present invention can be used in networks which do not have a hub, such as a direct connections between two nodes with each node determining the protocol capabilities of the other node. Ad described above, the link test pulse and iso probe signals are related in that, for example, a 10 Base T node will respond in the same fashion to receipt of either type of pulse. However, the test signals could be provided in forms which are unique to each type of protocol. In such a system, a data source/sink would output a first type of test pulse or other signal and, if no response was received, would output a second type of test pulse or signal, and so forth until a response was received indicating the protocol capability at the other end of the link. A data source/sink could be configured to determine all possible protocol capabilities of the apparatus at the other end of the link rather than determining the "highest" or "best" capability available or using the first capability detected. The devices at each end could select a protocol capability other than the "highest" or "best" capability. It would be possible for a node to store an indication of its capabilities, such as in a table or other memory device, and to output the information upon receiving an inquiry. It would also be possible for a network to initialize in a common protocol, e.g., a 10 Base T protocol, and, thereby, exchange information, using that protocol indicating additional protocol capabilities of the components of the system. Thereafter, the systems could reconfigure themselves to use desired ones of the available protocols.

Although the present invention has been described by way of preferred embodiments and certain variations and modifications, other variations and modifications can also be used, the invention being defined by the following claims.

TABLE IA

| | | | | | | | | | | | | | | | | |
|---|---|---|---|---|---|---|---|---|---|---|---|---|---|---|---|---|
| BLOCK 0: | | | | | | | | | | | | | | | | |
| J | K | E | B | E | B | E | B | E | B | E | B | E | B | E | E | Group0 |
| E | E | E | B | E | B | E | B | E | B | E | B | E | B | E | E | Group1 |
| E | E | E | B | E | B | E | B | E | B | E | B | E | B | E | E | Group2 |
| E | E | E | B | E | B | E | B | E | B | E | B | E | B | E | E | Group3 |
| E | E | E | B | E | B | E | B | E | B | E | B | E | B | E | E | Group4 |
| E | E | E | B | E | B | E | B | E | B | E | B | E | B | E | E | Group5 |
| E | E | E | B | E | B | E | B | E | B | E | B | E | B | E | E | Group6 |
| E | E | E | B | E | B | E | B | E | B | E | B | E | B | E | E | Group7 |
| BLOCK 1: | | | | | | | | | | | | | | | | |
| M | M | E | B | E | B | E | B | E | B | E | B | E | B | E | E | Group8 |
| E | E | E | B | E | B | E | B | E | B | E | B | E | B | E | E | Group9 |
| E | E | E | B | E | B | E | B | E | B | E | B | E | B | E | E | Group10 |
| E | E | E | B | E | B | E | B | E | B | E | B | E | B | E | E | Group11 |
| E | E | E | B | E | B | E | B | E | B | E | B | E | B | E | E | Group12 |
| E | E | E | B | E | B | E | B | E | B | E | B | E | B | E | E | Group13 |
| E | E | E | B | E | B | E | B | E | B | E | B | E | B | E | E | Group14 |
| E | E | E | B | E | B | E | B | E | B | E | B | E | B | E | E | Group15 |
| BLOCK 2: | | | | | | | | | | | | | | | | |
| D | D | E | B | E | B | E | B | E | B | E | B | E | B | E | E | Group16 |
| E | E | E | B | E | B | E | B | E | B | E | B | E | B | E | E | Group17 |
| E | E | E | B | E | B | E | B | E | B | E | B | E | B | E | E | Group18 |
| E | E | E | B | E | B | E | B | E | B | E | B | E | B | E | E | Group19 |
| E | E | E | B | E | B | E | B | E | B | E | B | E | B | E | E | Group20 |
| E | E | E | B | E | B | E | B | E | B | E | B | E | B | E | E | Group21 |
| E | E | E | B | E | B | E | B | E | B | E | B | E | B | E | E | Group22 |
| E | E | E | B | E | B | E | B | E | B | E | B | E | B | E | E | Group23 |
| BLOCK 3: | | | | | | | | | | | | | | | | |
| E | M | E | B | E | B | E | B | E | B | E | B | E | B | E | E | Group24 |
| E | E | E | B | E | B | E | B | E | B | E | B | E | B | E | E | Group25 |
| E | E | E | B | E | B | E | B | E | B | E | B | E | B | E | E | Group26 |
| E | E | E | B | E | B | E | B | E | B | E | B | E | B | E | E | Group27 |
| E | E | E | B | E | B | E | B | E | B | E | B | E | B | E | E | Group28 |
| E | E | E | B | E | B | E | B | E | B | E | B | E | B | E | E | Group29 |
| E | E | E | B | E | B | E | B | E | B | E | B | E | B | E | E | Group30 |
| E | E | E | B | E | B | E | B | E | B | E | B | E | B | E | E | Group31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel

TABLE IB

| | | | | | | | | | | | | | | | | |
|---|---|---|---|---|---|---|---|---|---|---|---|---|---|---|---|---|
| BLOCK 0: | | | | | | | | | | | | | | | | |
| J | K | B | B | B | B | B | B | B | B | B | B | B | B | B | B | Group0 |
| B | B | B | B | B | B | B | B | B | B | B | B | B | B | B | B | Group1 |
| B | B | B | B | B | B | B | B | B | B | B | B | B | B | B | B | Group2 |
| B | B | B | B | B | B | B | B | B | B | B | B | B | B | B | B | Group3 |
| B | B | B | B | B | B | B | B | B | B | B | B | B | B | B | B | Group4 |
| B | B | B | B | B | B | B | B | B | B | B | B | B | B | B | B | Group5 |
| B | B | B | B | B | B | B | B | B | B | B | B | B | B | B | B | Group6 |
| B | B | B | B | B | B | B | B | B | B | B | B | B | B | I | I | Group7 |
| BLOCK 1: | | | | | | | | | | | | | | | | |
| M | M | B | B | B | B | B | B | B | B | B | B | B | B | B | B | Group8 |
| B | B | B | B | B | B | B | B | B | B | B | B | B | B | B | B | Group9 |
| B | B | B | B | B | B | B | B | B | B | B | B | B | B | B | B | Group10 |
| B | B | B | B | B | B | B | B | B | B | B | B | B | B | B | B | Group11 |
| B | B | B | B | B | B | B | B | B | B | B | B | B | B | B | B | Group12 |
| B | B | B | B | B | B | B | B | B | B | B | B | B | B | B | B | Group13 |
| B | B | B | B | B | B | B | B | B | B | B | B | B | B | B | B | Group14 |
| B | B | B | B | B | B | B | B | B | B | B | B | B | B | I | I | Group15 |
| BLOCK 2: | | | | | | | | | | | | | | | | |
| D | D | B | B | B | B | B | B | B | B | B | B | B | B | B | B | Group16 |
| B | B | B | B | B | B | B | B | B | B | B | B | B | B | B | B | Group17 |
| B | B | B | B | B | B | B | B | B | B | B | B | B | B | B | B | Group18 |
| B | B | B | B | B | B | B | B | B | B | B | B | B | B | B | B | Group19 |
| B | B | B | B | B | B | B | B | B | B | B | B | B | B | B | B | Group20 |

TABLE IB-continued

| | | | | | | | | | | | | | | | |
|---|---|---|---|---|---|---|---|---|---|---|---|---|---|---|---|
| B | B | B | B | B | B | B | B | B | B | B | B | B | B | B | Group21 |
| B | B | B | B | B | B | B | B | B | B | B | B | B | B | B | Group22 |
| B | B | B | B | B | B | B | B | B | B | B | B | B | I | I | Group23 |
| BLOCK 3: | | | | | | | | | | | | | | | |
| I | M | B | B | B | B | B | B | B | B | B | B | B | B | B | Group24 |
| B | B | B | B | B | B | B | B | B | B | B | B | B | B | B | Group25 |
| B | B | B | B | B | B | B | B | B | B | B | B | B | B | B | Group26 |
| B | B | B | B | B | B | B | B | B | B | B | B | B | B | B | Group27 |
| B | B | B | B | B | B | B | B | B | B | B | B | B | B | B | Group28 |
| B | B | B | B | B | B | B | B | B | B | B | B | B | B | B | Group29 |
| B | B | B | B | B | B | B | B | B | B | B | B | B | B | B | Group30 |
| B | B | B | B | B | B | B | B | B | B | B | B | B | I | I | Group31 |

JK = Frame Synchronization Pattern
M = Maintenance Channel
D = D Channel
I = Idle Data
B = Isochronous Channel

TABLE II

| Symbol | Encoded (5 bit) | Description |
|---|---|---|
| 0 | 11110 | Data 0 |
| 1 | 01001 | Data 1 |
| 2 | 10100 | Data 2 |
| 3 | 10101 | Data 3 |
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |
| V | 00110 | Invalid |
| V | 01000 | Invalid |
| V | 10000 | Invalid |

TABLE III

| | |
|---|---|
| LG 13: | isolink & 16ms |
| | clr 16ms |
| | index = 0 |
| | clr 62.5us |
| | lp = 1 |
| LG 11: | !0baseT & (16 ms \| txen) |
| | clr 16ms |
| | lp=txen |
| LG 12: | isosleep & sync |
| | clr 16ms |
| LG 21: | !sync |
| | lp = 1 |
| LG 34: | 62.5 μs |
| | clr 62.5 |
| | lp=data\|index\| |

TABLE III-continued

| | |
|---|---|
| LG 43: | 62.5 μs & iindex !=15) |
| | :p=1 |
| | inc index |
| LG 41: | 62.5 μs & iindex=15) |
| | lp=1 |

TABLE IV

| Term | Meaning | Value |
|---|---|---|
| isolink | Enables Generation of isolink pattern | Not Applicable |
| 16ms | 16 ms timer | 16 ms |
| 62.5us | 62.5 μs timer | 62.5 μs |
| lp | limk pulse | Not Applicable |
| txen | Transmit enable | Not Applicable |
| isosleep | Enables Generation of link low power link pulses | Not Applicable |
| sync | Signal from template generator indicating start of cycle | Not Applicable |
| 10 Base T | Enable Generation of 10 Base T link pulses | Not Applicable |

TABLE V

! reset
I0baset = 1
linkgood = 1
setlltt = 1
setltmt = 1
bp1 = receive + (linkpulse * ltmtDone)
I0baset = 1
linkgood = 1
setlltt = 1
setlterm = 1
bp2 = fastlink
bp3 = $\overline{\text{lltdone}}$ *$\overline{\text{receive}}$* $\overline{\text{linkpulse}}$
loadlc = 1
I0baset = 1
bp4 = receive
I0baset = 1
bp5 = $\overline{\text{fastlink}}$
bp6 = $\overline{\text{receive}}$* $\overline{\text{linkpulse}}$
I0baset = 1
setltmt = !
setltxt = 1

TABLE V-continued bp7 = LCDone + receive
I0baset = 1
bp8 = fastlink
bp9 = linkpulse * ltmtDone
I0baset = 1
declc = 1
bp10 = $\overline{\text{receive}}$* $\overline{\text{ltxtDone}}$
linkpulse * $\overline{\text{ltmtDone}}$
I0baset = 1
loadlc = 1
bp11 = $\overline{\text{receive}}$* $\overline{\text{txc}}$
I0baset = 1
linkgood = 1
setllt = 1
setltmt = 1
bp12 = $\underline{\text{fastlink}}$*
receive * txe
bp13 = receive
$\underline{\text{I0baset}}$ = 1
bp14 = receive
$\underline{\text{I0baset}}$ = 1
bp15 = fastlink
loadlc = 1
I0baset = 1

TABLE VI

| Term | Meaning | Value |
|---|---|---|
| IObaset | Enable IObase·T Mode | Not Applicable |
| linkgood | IObaset state machine has detected good link pulses | Not Applicable |
| setllt | Set Limit Loss Timer | Not Applicable |
| setltmt | Set Link Timer Min Time | Not Applicable |
| receive | Now called ipact | Not Applicable |
| linkpulses | Link Pulses from Front End | Not Applicable |
| ltmtDone | Link Time Min Timer Done | 4 ms |
| fastlink | Iso Link Detector | Not Applicable |
| lltdone | Link Loss Timer Done | 60 ms |
| loadlc | Load Link Counter Counts Link Pulses | Not Applicable |
| setltxt | Set Link Test Max Timer · Same as sltxt | Not Applicable |
| LCDone | Link Counter Done | Not Applicable |
| declc | Decrement Link Counter | Not Applicable |
| ltxtDone | Link Test Max Timer Done | 32 ms |
| txe | Transmit Enable | Not Applicable |
| txc | Transmit Clock | Not Applicable |

TABLE VII bp1 = linkpulse
setltmt = 1
bp2 = flmtDone
bp3 = linkpulse * $\overline{\text{flmtDone}}$
settlmt = 1
bp4 = flmtDone
bp5 = linkpulse * flmtDone
setflmt = 1
bp6 = flmtDone
bp7 = linkpulse * flmt + Done
setflmt = 1
fastlink = 1
bp8 = flmtDone * linkpulse
fastlink = 1
setflmt = 1
bp9 = flmtDone
fastlink = 1
setltxt = 1
bp10 = receive
setltxt = 1
$\underline{\text{fastlink}}$ = 1
bp11 = receive * ltxt Done
resetreg = 1

TABLE VII-continued bp12 = linkpulse
setfldt= 1
setltmt = 1
setltxt = 1
fastlink = 1
bp13 = ltmtDone
fastlink = 1
shiftrow = 1
bp14 = linkpulse * $\overline{\text{fldtDone}}$
shift1 = 1
setltxt = 1
settim = 1
fastlink = 1
bp15 = linkpulse * fldtDone
setltxt = 1
setlim = 1
settldt = 1
fastlink = 1
bp17 = linkpulse * fldtDone
setltxt = 1
setlim = 1
settldt = 1
fastlink = 1
bp18 = ltmDone
fastlink = 1
shiftrow = 1
unconditional
setrlm = 1
setltrm = 1
setltxt = 1
fastlink = 1

TABLE VIII

| Term | Meaning | Value |
|---|---|---|
| setflmt | Set Fast Link Max Timer | 156.25 μs |
| flmtDone | Fast Link Max Timer Done | Not Applicable |
| resetreg | Reset Registers · Used to clear registers upon loss of carrier | Not Applicable |
| setfldt | Set Fast Link Data Timer | 93.75 μs |
| shiftrow | Shift Pointer to next row of link data shift register | Not Applicable |
| fldtDone | Fast Link Data Timer Done | Not Applicable |
| shift1 | Shift a 1 bit into the link data shift register | Not Applicable |
| shift0 | Shift a 0 bit into the link data shift register | Not Applicable |

TABLE IX

| Signal | Meaning |
|---|---|
| ethclock | Ethernet clock |
| farack | Far acknowledge · used in link protocol |
| isogood | Used to indicate isolink pattern good |
| isotype | field in isolink pattern indicating ISO usage · normal, wideband, none. reserved |
| loadrxmode | Load receive mode register |
| porttype | Field in isolink pattern indicating port type · node, hub |
| reset | Hardware reset |
| resetlink | Reset signal used to clear contents of the receive link registers |
| rxmodebus | Conveys the contents of the received link pattern |

TABLE IX-continued

| Signal | Meaning |
|---|---|
| setackrx | Set receive link acknowledge bit |
| setlim | Set link initialization match · used to indicate that the link pattern was received consistently 3 times and was compatible with mode of device |
| setlinm | Set link initialization no match · used to indicate that the link pattern was received consistently 3 times and was not compatible with mode of device |
| temptype | Template type · field in link pattern · isoenet, isotoken, reserved |
| txe | Transmit enable |
| window | Used to frame a group of link pulses to ensure that there is exactly 16 bits |
| tmodebus | Link pattern to be transmitted conveyed by this bus |

TABLE X

| Term | Meaning | Value |
|---|---|---|
| llt | Link Loss Timer | 60 ms |
| ltmt | Link Test Min Timer | 4 ms |
| ltxt | Link Test Max Timer | 32 ms |
| flmt | Fast Link Max Timer | 156.25 μs |
| fldt | Fast Link Data Timer | 94 μs |
| ipact | Input Packet from Squelch | Not Applicable |
| sflmt | Set Fast Link Max Timer | Not Applicable |
| sltxt | Set Link Test Max Timer | Not Applicable |

What is claimed is:

1. In a network having at least a first data source/sink and a second data source/sink coupled together by a physical medium, apparatus for determining at least one protocol capability of said second data source/sink, comprising:

first means, coupled to said first source/sink, for placing a first signal onto said physical medium, said first signal indicating a first protocol capability of said first source/sink;

second means, coupled to said second data source/sink, for receiving said first signal, third means, coupled to said second data source/sink, for transmitting a second signal onto said physical medium when said second data source/sink has said first protocol capability, said second signal comprising a plurality of pulses spaced-apart by a first time interval, and a third signal, different from said second signal, when said second data source/sink has a second protocol capability, said third signal comprising a plurality of pulses spaced-apart by a second time interval, different from said first time interval;

fourth means, coupled to said first data source/sink, for detecting whether said signal transmitted by said second means is said second signal or said third signal, and fifth means, coupled to said first data source/sink, for establishing communication with said second data source/sink using said first protocol if said fourth means detects said second signal and using said second protocol if said fourth means detects said third signal.

2. Apparatus, as claimed in claim 1, wherein said first time interval is about 125 microseconds.

3. Apparatus, as claimed in claim 1, wherein said second time interval is about 16 milliseconds.

4. Apparatus, as claimed in claim 1, wherein said second signal further comprises a plurality of data pulses.

5. Apparatus, as claimed in claim 4, wherein each of said data pulses is generated a predetermined time interval after one of said plurality of pulses of said second signal.

6. Apparatus, as claimed in claim 5, wherein said predetermined time interval is about 62.5 microseconds.

7. In a network having at least a first data source/sink and a second data source/sink coupled together by a physical medium, a state machine apparatus for generating a first signal for transmission over said physical medium, comprising:

means for receiving said first signal over *said* physical medium indicating a communication protocol capability of a first source/sink;

means for determining whether said first signal has a first period or a second period, said second period being shorter than said first period;

means for outputting a second signal, having said first period, when said first signal has said first period;

means for preventing output of said second signal when said first signal has said second period.

8. In a network having at least a first data source/sink and a second data source/sink coupled together by a physical medium, a state machine apparatus for generating a first pulsed signal for transmission over said physical medium, comprising:

means for receiving said first pulsed signal over said physical medium indicating a communication protocol capability of a first source/drain;

means for determining whether said first pulsed signal has a first period or a second period, said second period being shorter than said first period;

means for outputting a second signal, having said second period, when said first signal has said second period and after a predetermined number of pulses of said first signal have been received.

9. Apparatus, as claimed in claim 8, wherein said predetermined number of pulses is three.

10. Apparatus, as claimed in claim 8 wherein said first period signal comprises a plurality of periodic pulses and a plurality of data pule windows located a predetermined period after each of said periodic pulses and further comprising:

means for determining the state [or] *of* said first signal in at least some of said plurality [or] *of* data pulse windows.

11. In a network having at least a first data source/sink and a second data source/sink coupled together by a physical medium, a method for determining at least one protocol capability of said second data source/sink, comprising:

placing a first signal onto said physical medium by said first data source/sink, said first signal indicating a first protocol capability of said first source/sink;

receiving said first signal in said second data source/sink;

transmitting a second signal onto said physical medium by said second source/sink when said second data source/sink has said first protocol capability, said second comprising a plurality of pulses [space-apart] *spaced-apart* by a first time interval, and outputting a third signal, different from said second signal, when said second data source/sink has a second protocol capability, said third signal comprising a plurality of pulses spaced-apart by a second time interval, different from said first time interval;

detecting, in said first data source/sink, whether said signal transmitter by said second means is said second signal or said third signal, and establishing communication with said second data source/sink using said first protocol if [said fourth means detects] said second signal *is detected* and using said second protocol if [said fourth means detects] said third signal *is detected*.

12. A method, as claimed in claim 11, wherein said second signal further comprises a plurality of data pulses.

13. A method, as claimed in claim 12, wherein each of said data pulses is output a predetermined time interval after one of said plurality of pulses of said second signal.

*14. In a network having at least a first data source/sink and a second data source/sink coupled together by a physical medium, a method for determining at least one protocol capability of the second data source/sink, comprising:*

*placing first data pulses onto the physical medium, timing characteristics and pattern of the first data pulses indicating a first protocol capability of the first source/sink;*

*receiving the first data pulses in the second data source/sink;*

*transmitting second data pulses onto the physical medium from the second data source/sink, wherein timing characteristics and pattern of the second data pulses indicate the first protocol capability when the second data source/sink has the first protocol capability, wherein timing characteristics and pattern of the second data pulses indicate a second protocol capability when the second data source/sink has the second protocol capability;*

*detecting whether the second pulses indicate the first protocol capability or the second protocol capability; and*

*establishing communication with the second data source/sink using the first protocol if the second data pulses indicate the first protocol capability and using the second protocol if the second data pulses indicate the second protocol capability.*

*15. In a network having at least a first data source/sink and a second data source/sink coupled together by a physical medium, a method for determining a communication protocol capability for data transmission over the physical medium, comprising:*

*receiving first data pulses over the physical medium;*

*determining whether timing characteristics and pattern of the first data pulses indicate a first communication protocol capability;*

*selectively outputting second data pulses in response to the first data pulses, wherein the second data pulses are output if the second data source/sink operates in accordance with the first communication protocol capability; and*

*preventing output of the second data pulses if the second data source/sink does not operation in accordance with the first communication protocol capability.*

*16. A method for communicating data between a first data source/sink and a second data source/sink, the second data source/sink operating in accordance with a plurality of protocol capabilities, the method comprising the steps of:*

*storing information in a first storage location in the first data source/sink;*

*extracting information from data pulses transmitted from the second data source/sink to the first data source/sink and storing the extracted information in a second storage location;*

*at the first data source/sink, determining the protocol capabilities of the second data source/sink; and*

*determining the method for communicating data between the first data source/sink and the second data source/sink based upon the determined protocol capabilities of the second data source/sink.*

*17. The method of claim 16, wherein the first or second storage locations comprise a register, a memory or a table, wherein the information stored in the first storage location comprises signaling rate information and/or channel protocol information.*

*18. The method of claim 16, wherein the information stored in the first storage location indicates a plurality of protocol capabilities of the first data source/sink and is encoded into a signal comprised of data pulses transmitted from the first data source/sink to the second data source/sink.*

*19. The method of claim 16, wherein a state machine determines the protocol capabilities of the second data source/sink.*

*20. The method of claim 16, wherein the data communicated between the first data source/sink and the second data source/sink comprises an isochronous data.*

*21. The method of claim 20, wherein the isochronous data comprises video data.*

*22. The method of claim 20, wherein the isochronous data comprises telephone data.*

*23. The method of claim 16, wherein the data is communicated between the first data source/sink and the second data source/sink in accordance with a protocol selected from the group consisting of: isochronous token ring, isochronous Ethernet, non-isochronous Ethernet, FDDI-II, and X.25.*

*24. The method of claim 16, wherein the first and second data sources/sinks comprise a portion of a star topology network.*

*25. The method of claim 16, wherein the first and second data sources/sinks comprise a portion of a non-star topology network.*

*26. The method of claim 16, wherein the first and second data sources/sinks comprise a portion of a ring topology network.*

*27. The method of claim 16, wherein the first and second data sources/sinks comprise a portion of a tree topology network.*

*28. The method of claim 16, wherein a physical medium coupled between the first data source/sink and the second data source/sink comprising a twisted pair, coax cable or fiber optic.*

*29. A method for communicating data between a first data source/sink and a second data source/sink, the method comprising the steps of:*

*communicating data between the first data source/sink and the second data source/sink in accordance with a first communication protocol;*

*exchanging information between the first data source/sink and the second data source/sink, wherein the information is exchanged in the form of data pulses, wherein timing characteristics and pattern of the data pulses indicate protocol capabilities of the first and/or second data source/sinks;*

*reconfiguring the first and second data source/sinks; and*

*communicating data between the first data source/sink and the second data source/sink in accordance with a second communication protocol.*

*30. The method of claim 29, wherein the information that indicates protocol capabilities is stored in a register, a memory or a table.*

*31. The method of claim 29, wherein a state machine determines the protocol capabilities of the data sources/sinks.*

*32. The method of claim 29, wherein data communicated between the first data source/sink and the second data source/sink comprises an isochronous data.*

*33. The method of claim 32, wherein the isochronous data comprises video data.*

*34. The method of claim 32, wherein the isochronous data comprises telephone data.*

*35. The method of claim 29, wherein the data is communicated between the first data source/sink and the second data source/sink in accordance with a protocol selected from the group consisting of: isochronous token ring, isochronous Ethernet, non-isochronous Ethernet, FDDI-II, and X.25.*

*36. The method of claim 29, wherein the first and second data sources/sinks comprise a portion of a star topology network.*

*37. The method of claim 29, wherein the first and second data sources/sinks comprise a portion of a non-star topology network.*

*38. The method of claim 29, wherein the first and second data sources/sinks comprise a portion of a ring topology network.*

*39. The method of claim 29, wherein the first and second data sources/sinks comprise a portion of a tree topology network.*

*40. The method of claim 29, wherein a physical medium coupled between the first data source/sink and the second data source/sink comprises a twisted pair, coax cable or fiber optic.*

*41. A method for communicating data between a first data source/sink and a second data source/sink, the method comprising the steps of:*

*exchanging information between the first data source/sink and the second data source/sink, wherein the information is exchanged in the form of data pulses, wherein timing characteristics and pattern of the data pulses indicate protocol capabilities of the first and/or second data source/sinks, wherein the protocol capabilities of the first and second data sources/sinks include at least first and second protocol capabilities;*

*communicating data between the first data source/sink and the second data source/sink in accordance with a first communication protocol at a first point in time;*

*configuring the first and second data source/sinks to operate in accordance with a second communication protocol; and*

*communicating data between the first data source/sink and the second data source/sink in accordance with the second communication protocol.*

*42. The method of claim 41, wherein the information that indicates protocol capabilities is stored in a register, a memory or a table.*

*43. The method of claim 41, wherein a state machine determines the protocol capabilities of the data sources/sinks.*

*44. The method of claim 41, wherein data communicated between the first data source/sink and the second data source/sink comprises an isochronous data.*

*45. The method of claim 44, wherein the isochronous data comprises video data.*

*46. The method of claim 44, wherein the isochronous data comprises telephone data.*

*47. The method of claim 41, wherein the data is communicated between the first data source/sink and the second data source/sink in accordance with a protocol selected from the group consisting of: isochronous token ring, isochronous Ethernet, non-isochronous Ethernet, FDDI-II, and X.25.*

*48. The method of claim 41, wherein the first and second data sources/sinks comprise a portion of a star topology network.*

*49. The method of claim 41, wherein the first and second data sources/sinks comprise a portion of a non-star topology network.*

*50. The method of claim 41, wherein the first and second data sources/sinks comprise a portion of a ring topology network.*

*51. The method of claim 41, wherein the first and second data sources/sinks comprise a portion of a tree topology network.*

*52. The method of claim 41, wherein a physical medium coupled between the first data source/sink and the second data source/sink comprises a twisted pair, coax cable or fiber optic.*

* * * * *